US008910075B2

(12) United States Patent
Ito

(10) Patent No.: US 8,910,075 B2
(45) Date of Patent: Dec. 9, 2014

(54) STORAGE MEDIUM STORING INFORMATION PROCESSING PROGRAM, INFORMATION PROCESSING APPARATUS AND INFORMATION PROCESSING METHOD FOR CONFIGURING MULTIPLE OBJECTS FOR PROPER DISPLAY

(75) Inventor: Yuichiro Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 269 days.

(21) Appl. No.: 12/605,760

(22) Filed: Oct. 26, 2009

(65) Prior Publication Data

US 2010/0185977 A1    Jul. 22, 2010

(30) Foreign Application Priority Data

Jan. 22, 2009   (JP) ................................. 2009-011522

(51) Int. Cl.
G06F 3/048    (2013.01)
A63F 13/40   (2014.01)

(52) U.S. Cl.
CPC ............. *A63F 13/10* (2013.01); *A63F 2300/66* (2013.01); *A63F 2300/6045* (2013.01); *A63F 2300/1075* (2013.01)
USPC ............................ 715/790; 715/793; 715/797

(58) Field of Classification Search
USPC .................................... 715/788–798; 463/11
See application file for complete search history.

(56) References Cited

U.S. PATENT DOCUMENTS

| | | | | |
|---|---|---|---|---|
| 5,333,255 A | * | 7/1994 | Damouth | 715/776 |
| 6,018,333 A | * | 1/2000 | Denber | 715/790 |
| 6,166,738 A | * | 12/2000 | Robertson et al. | 715/839 |
| 8,402,382 B2 | * | 3/2013 | Agarawala et al. | 715/765 |
| 2003/0112278 A1 | * | 6/2003 | Driskell | 345/788 |
| 2004/0255254 A1 | * | 12/2004 | Weingart et al. | 715/804 |
| 2006/0020902 A1 | * | 1/2006 | Tabi | 715/790 |
| 2006/0109259 A1 | * | 5/2006 | Ohta | 345/173 |
| 2006/0112335 A1 | * | 5/2006 | Hofmeister et al. | 715/701 |
| 2006/0112353 A1 | * | 5/2006 | Okamoto et al. | 715/810 |
| 2008/0256454 A1 | * | 10/2008 | Latzina et al. | 715/732 |
| 2008/0261691 A1 | | 10/2008 | Kijima et al. | |
| 2008/0307351 A1 | * | 12/2008 | Louch et al. | 715/782 |
| 2009/0150775 A1 | * | 6/2009 | Miyazaki et al. | 715/702 |

FOREIGN PATENT DOCUMENTS

| | | |
|---|---|---|
| EP | 1 854 519 | 11/2007 |
| JP | 11-085788 | 3/1999 |
| JP | 2000-242390 | 9/2000 |
| JP | 2000-298679 | 10/2000 |
| JP | 2005-310059 | 11/2005 |

(Continued)

OTHER PUBLICATIONS

Oldham, Jeffrey D., et al., PCT/US2006/060906, Displaying Compact and Expanded Data Items, May 24, 2007.*

(Continued)

*Primary Examiner* — Doon Chow
*Assistant Examiner* — Wilson Varga
(74) *Attorney, Agent, or Firm* — Nixon & Vanderhye, P.C.

(57) ABSTRACT

A game apparatus includes an LCD, and a touch panel is provided on the LCD. On the LCD, a game screen of a tramp game is displayed. When a player performs a touch-on operation on a card object displayed on the game screen, if another card is overlapped with the touched card object, and the overlapping is large, this another card object is moved. Accordingly, a mark and a character (numeric or alphabetic character) of the card object on which the player performs a touch-on operation are displayed to be visually identifiable.

22 Claims, 25 Drawing Sheets

(56) References Cited

FOREIGN PATENT DOCUMENTS

JP          2007-328456          12/2007

OTHER PUBLICATIONS

Grall, Preston; Windows Vista in a Nutshell; O'Reilly Media, Inc., ISBN-10: 0-596-52707-1; Dec. 22, 2006; pp. 497-499.*

Watanabe, Nayuko; "Bubble Clusters: An Interface for Manipulating Spatial Aggregation of Graphical Objects," Oct. 10, 2007, ACM, UIST'07, ACM 978-1-59593-679-2/07/0010, pp. 173-182.*

Japanese Office Action issued for Japanese Patent Application No. 2009-011522, dated Dec. 18, 2012.

European Office Action issued for European Patent Application No. 09174049.8-2218, dated Dec. 18, 2012.

* cited by examiner (A) DISPLAY REGION OF LCD 14

(B) VIRTUAL SPACE

DISPLAY REGION OF TABLEAU PILE 102

☒ ···DOWNTURNED CARD   ☐ ···UPTURNED CARD

DISPLAY REGION OF TABLEAU PILE 102

FOCUSED CARD

STORAGE MEDIUM STORING INFORMATION PROCESSING PROGRAM, INFORMATION PROCESSING APPARATUS AND INFORMATION PROCESSING METHOD FOR CONFIGURING MULTIPLE OBJECTS FOR PROPER DISPLAY

CROSS REFERENCE OF RELATED APPLICATION

The disclosure of Japanese Patent Application No. 2009-11522 is incorporated herein by reference.

BACKGROUND OF THE INVENTION

1. Field of the Invention

The present invention relates to a storage medium storing an information processing program, an information processing apparatus, and an information processing method. More specifically, the present invention relates to a storage medium storing an information processing program, an information processing apparatus, and an information processing method which utilize a pointing device like a touch panel.

2. Description of the Related Art

One example of the related art is disclosed on an Internet website 1 (http://jp.realarcade.com/kabegami/games/compulsive solitaire/index.html). This Internet website 1 recites that a card game, such as Klondike, Spider, etc. is played by opening a window on a display of a personal computer. For example, in Klondike and Spider, cards are overlaid on the place according to a predetermined rule, and therefore, if the row of the cards is long, a player or a user generally enlarges the window so as to make the kind of the cards visible. Here, the kind of the cards means a mark (spades, diamonds, clovers, hearts) and a numeric character (2-10) or an alphabetic character (A, J, Q, K). Furthermore, the alphabetic characters A, J, Q, K respectively correspond to the numeric characters 1, 11, 12, 13.

Alternatively, another example of the related art is disclosed on an Internet website 2 (http://www.kemco.jp/applipage/04_game/soli.html), an Internet website 3 (http://www.g-mode.jp/appli/tenshisolitaire/) and an Internet website 4 (http://www.g-mode.jp/appli/tenshisolitaire/dx/). The Internet websites 2-4 each recites that a card game such as Klondike, Spider, etc. is played by utilizing a hand-held terminal provided with a game functions like a cellular phone.

As described above, as disclosed on the Internet website 1, in a case that a card game is played by means of the PC, even if the row of the cards arranged on the board is made long, the window is enlarged to make a region to display cards large, so that the kind of the cards is never invisible. That is, there is no difficulty in playing the game. However, in a case of the hand-held terminal like a cellular phone, a display screen of a display like an LCD is small and fixed, so that it is impossible to enlarge the window as in playing the card game by means of the PC. Thus, the kind of the cards may be invisible. Hence, the Internet websites 2-4 make the kind of the cards to be displayed visible by putting restrictions on the number of cards and the number of kinds. Furthermore, in the Internet websites 3 and 4, as to the cards about which the kind of the cards can be seen without viewing the content, by closely displaying the overlapped cards, the number of cards to be used in the game is made relatively more, but even in this case, the display screen (window) cannot be enlarged, so that there is a limitation on the number of cards and the kind thereof for use in comparison with playing by means of the PC. Thus, in a case that the hand-held terminal is used, the game is made simple, so that there is a problem of lacking spice.

SUMMARY

Therefore, it is a primary object of the present technology to provide a novel storage medium storing an information processing program, a novel information processing apparatus, and a novel information processing method.

Furthermore, another object of the present technology is to provide a storage medium storing an information processing program, an information processing apparatus and an information processing method to be able to easily grasp the contents of the plurality of overlapped objects even under the limited size of the display screen.

The present technology employs following features in order to solve the above-described problems. It should be noted that reference numerals and the supplements inside the parentheses show one example of a corresponding relationship with the embodiments described later for easy understanding of the present technology, and do not limit the present technology.

A first embodiment is an information processing program to be executed by a processor of an information processing apparatus, and executes an input detecting step for detecting coordinate data on the basis of a signal from a pointing device; a first operation determining step for determining whether or not a first operation is performed on a display region of a display on the basis of the coordinate data detected by the input detecting step; and an object movement controlling step for moving at least one out of a plurality of objects which are arranged in an overlapped manner in the display region to increase an exposed amount of the object below the moved object when the first operation determining step determines that the first operation is performed.

In the first embodiment, the information processing program is executed by a processor (34) of an information processing apparatus (10). An input detecting step (34) detects coordinate data on the basis of a signal from a pointing device (24). A first operation determining step (34, S19) determines whether or not a first operation is performed on a display region of a display (14) on the basis of the coordinate data detected by the input detecting step. An object movement controlling step (34, S11) moves at least one object out of a plurality of objects which are arranged in an overlapped manner in the display region to increase an exposed amount of the object below the moved object when the first operation determining step determines that the first operation is performed ("YES" in S19). An "object" merely referred hereafter means a single object or a plurality of objects.

According to the first embodiment, when there is a first operation on the display region moves, at least one out of the plurality of objects which are arranged in an overlapped manner is moved to increase the exposed amount of the object below the moved object, capable of making the displayed content visible. That is, even if there is a limitation on the size of the display screen, it is possible to easily grasp the contents of the plurality of overlapped objects.

A second embodiment is according to the first invention, wherein the object movement controlling step moves the object except for the object corresponding to a position indicated by the coordinate data.

In the second embodiment, the object movement controlling step moves the object except for the object corresponding to a position indicated by the coordinate data. That is, the object except for the object designated by the pointing device is moved.

According to the second embodiment, the object except for the object designated by the pointing device is moved, and therefore, it is possible to make the designated object easily viewable with the designated object unchanged.

A third embodiment is according to the first embodiment, wherein the object movement controlling step moves at least the one object to a direction away from the position indicated by the coordinate data.

In the third embodiment, the object movement controlling step moves at least the one object to a direction away from the position indicated by the coordinate data. Thus, the object except for the object designated by the pointing device is moved to be far away from the designated object, for example.

According to the third embodiment, the object is moved to be far away from the designated position, capable of making the designated object easily viewable.

A fourth embodiment is according to the first embodiment, wherein the information processing program causes the processor to further execute an overlap calculating step for calculating an overlapping degree between the plurality of objects; and the object movement controlling step moves at least one of the plurality of objects according to the overlapping degree between the plurality of objects calculated by the overlap calculating step.

In the fourth embodiment, the overlap calculating step (34, S163) calculates an overlapping degree between the plurality of objects. The object movement controlling step moves at least one of the plurality of objects according to the calculated overlapping degree.

According to the fourth embodiment, the object is moved according to the overlapping degree, capable of appropriately performing a movement control of the objects.

A fifth embodiment is according to the fourth embodiment, wherein the overlap calculating step calculates a value indicating an overlapping degree between the plurality of objects, and the object movement controlling step moves at least one out of the plurality of objects when the first operation determining step determines that the first operation is performed, and the value indicating the overlapping degree calculated by the overlap calculating step is equal to or more than a predetermined value.

In the fifth embodiment, the overlap calculating step calculates a value indicating an overlapping degree (space between the Y coordinates in this embodiment) between the plurality of objects. Here, the shorter the space between the Y coordinates is, the larger the overlapping degree is, and the longer the space between the Y coordinates is, the smaller the overlapping degree is. The object movement controlling step moves at least one out of the plurality of objects when the first operation determining step determines that the first operation is performed, and the value indicating the overlapping degree calculated by the overlap calculating step is equal to or more than a predetermined value ("NO" in S165).

According to the fifth embodiment, in a case that the value indicating the overlapping degree is equal to or more than a predetermined value, the object is moved, and therefore, if the predetermined value is set to a value allowing the player to view the content of the object, only when the content of the object cannot be viewed, the object can be moved.

A sixth embodiment is according to the first embodiment, wherein the information processing program causes the processor to further execute a second operation determining step for determining whether or not a second operation different from the first operation is performed on the basis of the coordinate data detected by the input detecting step, and an object selecting step for automatically selecting at least one object out of the selectable objects on the basis of the coordinate data detected by the input detecting step and the plurality of objects in an overlapped manner when the second operation determining step determines that the second operation is performed.

In the sixth embodiment, a second operation determining step (34, S113) determines whether or not a second operation different from the first operation is performed on the basis of the coordinate data detected by the input detecting step. An object selecting step (34, S117, S119, S121, S123, S125) automatically selects at least one object out of the selectable objects on the basis of the coordinate data detected by the input detecting step and the plurality of objects in an overlapped manner when the second operation determining step determines that the second operation is performed.

According to the sixth embodiment, at least one object is selected out of the selectable objects when there is a second operation. For example, the content of the object is known by the first operation, and then, a desired object can be selected by the following second operation. In addition, at least one object is automatically selected out of the selectable objects, capable of improving operability.

A seventh embodiment is an information processing program according to the sixth embodiment, wherein the information processing program causes the processor to further execute a selectable object deciding step for deciding a selectable object from the plurality of objects, and the object selecting step automatically selects at least one object out of the selectable objects decided by the selectable object deciding step when the second operation determining step determines that the second operation is performed.

In the seventh embodiment, the selectable object deciding step (32, S119) decides a selectable object from the plurality of objects. In this embodiment, according to the rule of the card game, the selectable object is decided. The object selecting step automatically selects at least one object out of the decided selectable objects when the second operation is performed.

According to the seventh embodiment, a desired object can be selected out of the selectable objects decided according to a predetermined rule, for example.

An eighth embodiment is according to the sixth embodiment, wherein the object selecting step selects an object arranged at a position closest to the position indicated by the coordinate data detected by the input detecting step out of the selectable objects.

In the eighth embodiment, the object selecting step selects an object arranged at a position closest to the position indicated by the detected coordinate data out of the selectable objects.

According to the eighth embodiment, the object arranged at the position closest to the detected coordinates is selected, capable of selecting a desired object without directly designating the object.

A ninth embodiment is according to the sixth embodiment, wherein the object selecting step automatically selects at least one object out of the selectable objects when the second operation determining step determines that the second operation is performed, and the object corresponding to the position indicated by the coordinate data is not selectable.

In the ninth embodiment, the object selecting step automatically selects at least one object out of the selectable objects when the second operation determining step determines that the second operation is performed, and the object corresponding to the position indicated by the coordinate data is not selectable. That is, in a case that the object designated by the pointing device is not selectable, the object is selected from the selectable objects.

According to the ninth embodiment, it is possible to select a desired object without directly designating the object.

A tenth embodiment is according to the sixth embodiment, wherein the object selecting step further selects an object in association with the object arranged in the position closest to the position indicated by the coordinate data detected by the input detecting step.

In the tenth embodiment, the object selecting step further selects an object in association with the object arranged in the position closest to the position indicated by the detected coordinate data.

According to the tenth embodiment, it is possible to select not only the desired object but also the object associated therewith by the second operation.

An eleventh embodiment is according to the sixth embodiment, wherein the information processing program causes the processor to further execute a displaying step for displaying at least one object selected by the object selecting step on the display.

In the eleventh embodiment, the displaying step (34, S53, S55, S57, S59, S61, S129) displays at least the one object selected by the object selecting step on the display.

According to the eleventh embodiment, the selected object is displayed on the display, and therefore, even if the object which is not displayed on the display is selected, by displaying it after the selection, it is possible to inform the user of the selected object.

A twelfth embodiment is according to the eleventh embodiment, wherein the displaying step displays at least the one object selected by the object selecting step at a position within the display region in correspondence with the position indicated by the coordinate data detected by the input detecting step.

In the twelfth embodiment, the displaying step displays the selected object at a position within the display region in correspondence with the position indicated by the detected coordinate data. For example, the selected object is displayed at the position (coordinates) designated within the display region.

According to the twelfth embodiment, the object is displayed in correspondence with the detected coordinates, capable of displaying the selected object so as to follow the coordinates, for example.

A thirteenth embodiment is according to the first embodiment, wherein the object movement controlling step moves at least one of the plurality of objects such that an exposed amount of each of the plurality of objects which is in an overlapped manner is a constant amount.

In the thirteenth embodiment, the object movement controlling step moves at least one out of the plurality of objects such that an exposed amount of each of the plurality of objects which is in an overlapped manner is a constant amount. For example, if there is two overlapped objects, one object is moved to any direction, or both of the objects are moved to opposite directions to each other.

According to the thirteenth embodiment, the object is moved so as to make the exposed amount of the plurality of overlapped objects constant, and therefore, if the constant amount is set to a value allowing the player to view the content of the object, it is possible to appropriately move the object.

A fourteenth embodiment is according to the first embodiment, wherein the pointing device includes a touch panel, and the input detecting step detects coordinate data corresponding to coordinate on the display region with respect to the position where a touch-on operation is performed on the touch panel.

In the fourteenth embodiment, the pointing device includes a touch panel. The input detecting step detects coordinate data corresponding to the coordinate on the display region with respect to the position where a touch on operation is performed.

According to the fourteenth embodiment, the coordinate on the display region with respect to the position where a touch on operation is performed on the touch panel is detected, capable of intuitively performing an input operation.

A fifteenth embodiment is according to the fourteenth embodiment, wherein the first operation determining step determines that there is the first operation when the touch-on operation to the touch panel is detected on the basis of the coordinate data detected by the input detecting step.

In the fifteenth embodiment, the first operation determining step determines that there is the first operation when the touch-on operation to the touch panel is detected on the basis of the detected coordinate data. For example, when a state in which coordinate data is not input shifts to a state in which coordinate data is input, a touch-on operation is detected. Thus, it is determined that there is the first operation.

According to the fifteenth embodiment, a touch-on operation is merely detected, capable of easily determining a first operation.

A sixteenth embodiment is according to the fourteenth embodiment, wherein the second operation determining step determines that there is the second operation when a dragging operation to the touch panel is detected on the basis of the coordinate data detected by the input detecting step.

In the sixteenth embodiment, when a dragging operation to the touch panel is detected on the basis of the detected coordinate data, the second operation determining step determines that there is the second operation. For example, in a case that a state in which the coordinate data is input is continuously detected, and the difference between the two coordinates indicated by temporally successive coordinate data is equal to or more than a predetermined value, a dragging operation is detected. Thus, it is determined that there is the second operation.

According to the sixteenth embodiment, a dragging operation is merely detected, and therefore, it is possible to simply determine a second operation.

A seventeenth embodiment is according to the first embodiment, wherein the information processing program causes the processor to further execute a returning step for returning at least the one object to a position before movement when the first operation determining step determines that the first operation ceases to be performed after the object movement controlling step moves at least the one object.

In the seventeenth embodiment, a returning step (34, S145, S147, S149, S151, S163, S165, S169, S173, S177) returns at least the one object to a position before movement when the first operation determining step determines that the first operation ceases to be performed after the object movement controlling step moves at least the one object.

According to the seventeenth embodiment, when the first operation ceases to be performed, the object moved according to the first operation is returned to the original position, and therefore, it is possible to surely view the content of the desired object without breaking the arrangement position of the objects before the first operation.

An eighteenth embodiment is according to the seventeenth embodiment, wherein the returning step returns at least the one object to the position before movement after a certain time period elapses from when the first operation determining step determines that the first operation ceases to be performed after the object movement controlling step moves at least the one object.

In the eighteenth embodiment, the returning step returns at least the one object to the position before movement after a certain time period elapses from when the first operation ceases to be performed after the object movement controlling step moves at least the one object.

According to the eighteenth embodiment, the object moved according to the first operation is returned to the original position after elapse of a certain period of time from when the first operation ceases to be performed, and therefore, it is possible to surely view the content of a desired object without breaking the arrangement position of the objects before the first operation.

A nineteenth embodiment is according to the sixth embodiment, wherein the information processing program causes the processor to further execute a selected object movement controlling step for moving at least the one object selected by the object selecting step so as to follow the position indicated by the coordinate data detected by the input detecting step.

In the nineteenth embodiment, a selected object moving step (34, S53, S55, S57, S59, S61) moves at least the one object selected by the object selecting step so as to follow the position indicated by the detected coordinate data.

According to the nineteenth embodiment, the selected object is moved to follow the detected coordinate, capable of moving the object with an intuitive operation.

A twentieth embodiment is an information processing apparatus comprising an input detecting means for detecting coordinate data on the basis of a signal from a pointing device; an operation determining means for determining whether or not a predetermined operation is performed on a display region of a display on the basis of the coordinate data detected by the input detecting means; and an object movement controlling means for moving at least one out of a plurality of objects which are arranged in an overlapped manner in the display region and increasing an exposed amount of the object below the moved object when the operation determining step determines that the predetermined operation is performed.

In the twentieth embodiment as well, similar to the first embodiment, even if there is a limitation on the size of the display screen, it is possible to easily view the contents of the plurality of overlapped objects.

A twenty-first embodiment is an information processing method, and includes following steps of: (a) detecting coordinate data on the basis of a signal from a pointing device, (b) determining whether or not a predetermined operation is performed on a display region of a display on the basis of the coordinate data detected by the step(a), and (c) moving at least one out of a plurality of objects which are arranged in an overlapped manner in the display region and increasing an exposed amount of the object below the moved object when the step (b) determines that the predetermined operation is performed.

In the twenty-first embodiment as well, similar to the first embodiment, even if there is a limitation on the size of the display screen, it is easily view the contents of the plurality of overlapped objects.

The above described objects and other objects, features, aspects and advantages of the present technology will become more apparent from the following detailed description of the present technology when taken in conjunction with the accompanying drawings.

DETAILED DESCRIPTION OF THE PREFERRED EMBODIMENTS

Figure 1:
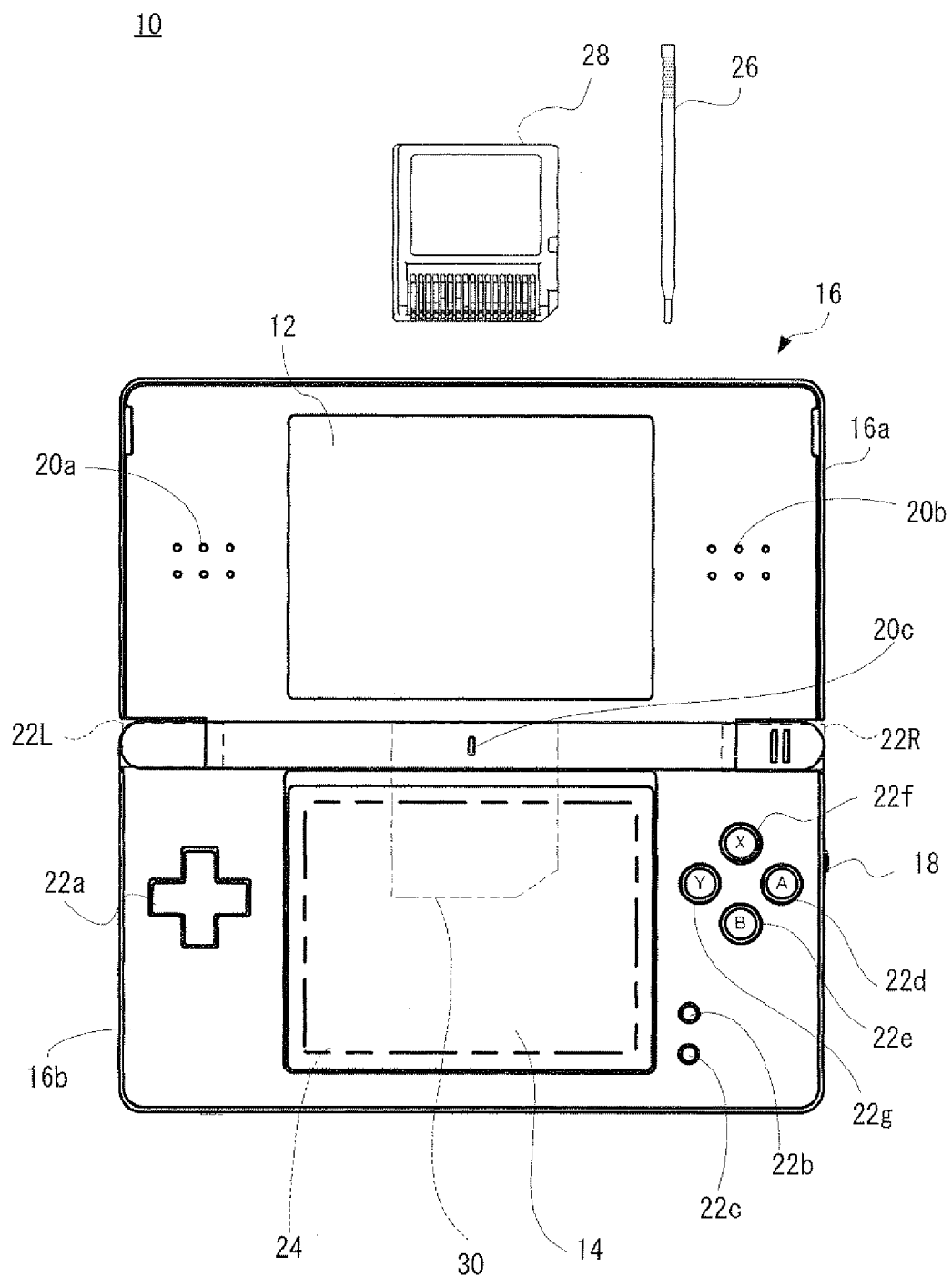
FIG. 1 is an illustrative view showing one embodiment of a game apparatus of the present invention.

Referring to FIG. 1, a game apparatus 10 of one embodiment of the present invention includes a first liquid crystal display (LCD) 12 and a second LCD 14. The LCD 12 and the LCD 14 are set on a housing 16 so as to be arranged in predetermined positions. In this embodiment, the housing 16 is composed of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape being approximately the same as the upper housing 16a, and has an opening formed so as to expose a display surface of the LCD 14 at an approximately center of the horizontal direction. On the right side face of the lower housing 16b, a power switch 18 is provided.

Furthermore, the upper housing 16a is provided with sound release holes 20a and 20b for speakers 36a and 36b (FIG. 2) on both sides of the LCD 12. The lower housing 16b is provided with a microphone hole 20c for a microphone (not illustrated) and operating switches 22 (22a, 22b, 22c, 22d, 22e, 22f, 22g, 22L and 22R).

The upper housing 16a and the lower housing 16b are rotatably connected at a lower side (lower edge) of the upper housing 16a and a part of an upper side (upper edge) of the lower housing 16b. Accordingly, in a case of not playing a game, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged, such as a flaw, etc. It should be noted that the upper housing 16a and the lower housing 16b are not necessarily rotatably connected with each other, and may alternatively be provided integrally (fixedly) to form the housing 16.

The operating switch 22 includes the direction instructing switch (cross switch) 22a, the start switch 22b, the select switch 22c, the action switch (A button) 22d, the action switch (B button) 22e, the action switch (X button) 22f, the action switch (Y button) 22g, the action switch (L button) 22L and the action switch (R button) 22R. The switch 22a is arranged at the left of the LCD 14 on one surface of the lower housing 16b. The other switches 22b-22g are arranged at the right of the LCD 14 on the one surface of the lower housing 16b. In addition, the switches 22L and 22R are arranged at the right and left corners on the upper side surface of the lower housing 16b, sandwiching the connected portion with the upper housing 16a.

The direction instructing switch 22a functions as a digital joystick, and is utilized for instructing a moving direction of a player character (or player object) to be operated by a user or a player and instructing a moving direction of a cursor, and so forth by operating any one of four depression portions. Also, a specific role can be assigned to each of the four depression portions, and by operating any one of the four depression portions, it is possible to designate (specify) the assigned role.

The start switch 22b is formed by a push button, and is utilized for starting (restarting), pausing a game, and so forth. The select switch 22c is formed by the push button, and utilized for a game mode selection, etc.

The action switch 22d, that is, the A button is formed by the push button, and allows the player character to perform an arbitrary action, except for instructing the direction, such as hitting (punching), throwing, catching (acquiring), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be utilized for operations similar to the A button 22d and B button 22e. Of course, the X button 22f and the Y button 22g are not necessarily utilized in the game play.

The action switch 22L (left push button) and the action switch 22R (right push button) are formed by push buttons, and the left push button (L button) 22L and the right push button (R button) 22R can be utilized for operations similar to the A button 22d and B button 22e, and utilized for subsidiary operations of the A button 22d and B button 22e. Furthermore, the L button 22L and the R button 22R can change the functions assigned to the direction switch 22a, the A button 22d, the B button 22e, the X button 22f, and the Y button 22g to other functions.

Also, on the top surface of the LCD 14, a touch panel 24 is provided. As the touch panel 24, any kinds of a resistance film system, an optical system (infrared rays system) and an electrostatic capacitive coupling system, for example, can be utilized. In response to an operation (touch-on operation) by depressing, stroking, touching, and so forth with a stick 26, a pen (stylus pen), or a finger (hereinafter, referred to as "stick 26 or the like") on the top surface of the touch panel 24, the touch panel 24 detects coordinates of an operated position by the stick 26 or the like to output coordinates data corresponding to the detected coordinates.

Additionally, in this embodiment, a resolution of the display surface of the LCD 14 (the same is true for the LCD 12) is 256 dots×192 dots. A detection accuracy of the touch panel 24 is also rendered 256 dots×192 dots in correspondence with the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as, a player character, etc. may be displayed on the one LCD, and items belonging to the player character may be displayed on the other LCD. Additionally, an operation screen (game screen) of the game may be displayed on one LCD (LCD 14 in this embodiment), and another game screen including information relating to the game (score, level, etc.) can be displayed on the other LCD (LCD 12 in this embodiment). Alternatively, by utilizing the two LCD 12 and LCD 14 as one screen, it is possible to display a large monster (enemy character) to be defeated by the player character.

Accordingly, the player is able to designate (operate) an image, such as a player character, an enemy character, an item character, an operating object, etc. to be displayed on the screen of the LCD 14, and select (input) commands by operating the touch panel 24 with the use of the stick 26 or the like. Moreover, it is possible to change an orientation of a virtual camera (viewpoint) (direction of the line of sight) provided in a three-dimensional game space, and command a scrolling (gradual moving display) direction of the game screen (map).

Additionally, depending on the kind of the game, other input instructions can be made with the use of the touch panel 24. For example, it is possible to input a coordinate input instruction, and input by hand texts, numbers, symbols, etc. to the LCD 14.

Thus, the game apparatus 10 has the LCD 12 and the LCD 14 as display portions of two screens and by providing the touch panel 24 on a top surface of any one of them (LCD 14 in this embodiment), the game apparatus 10 has the two screens (12, 14) and the operating portions (22, 24) of two methods.

In addition, in this embodiment, the stick 26 can be housed in the housing portion (not shown) provided to the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on a back face or a lower end (button face) of the lower housing 16b. Although omitted in FIG. 1, a connector 32 (see FIG. 2) is provided at a depth portion of the loading slot 30 for connecting a connector (not shown) provided at an end portion in the loading direction of the memory card 28, and when the memory card 28 is loaded into the loading slot 30, the connectors are connected with each other and so that, the memory card 28 is accessible by a CPU core 34 (see FIG. 2) of the game apparatus 10.

It should be noted that although not illustrated in FIG. 1, the speakers 36a and 36b (see FIG. 2) are provided at positions corresponding to the sound release holes 20a and 20b inside the upper housing 16a.

Although omitted in FIG. 1, on the back surface of the lower housing 16b, a battery accommodating box is provided, and on the bottom surface of the housing 16b, a sound volume switch, an expansion connector and an earphone jack, etc. are provided.

Figure 2:
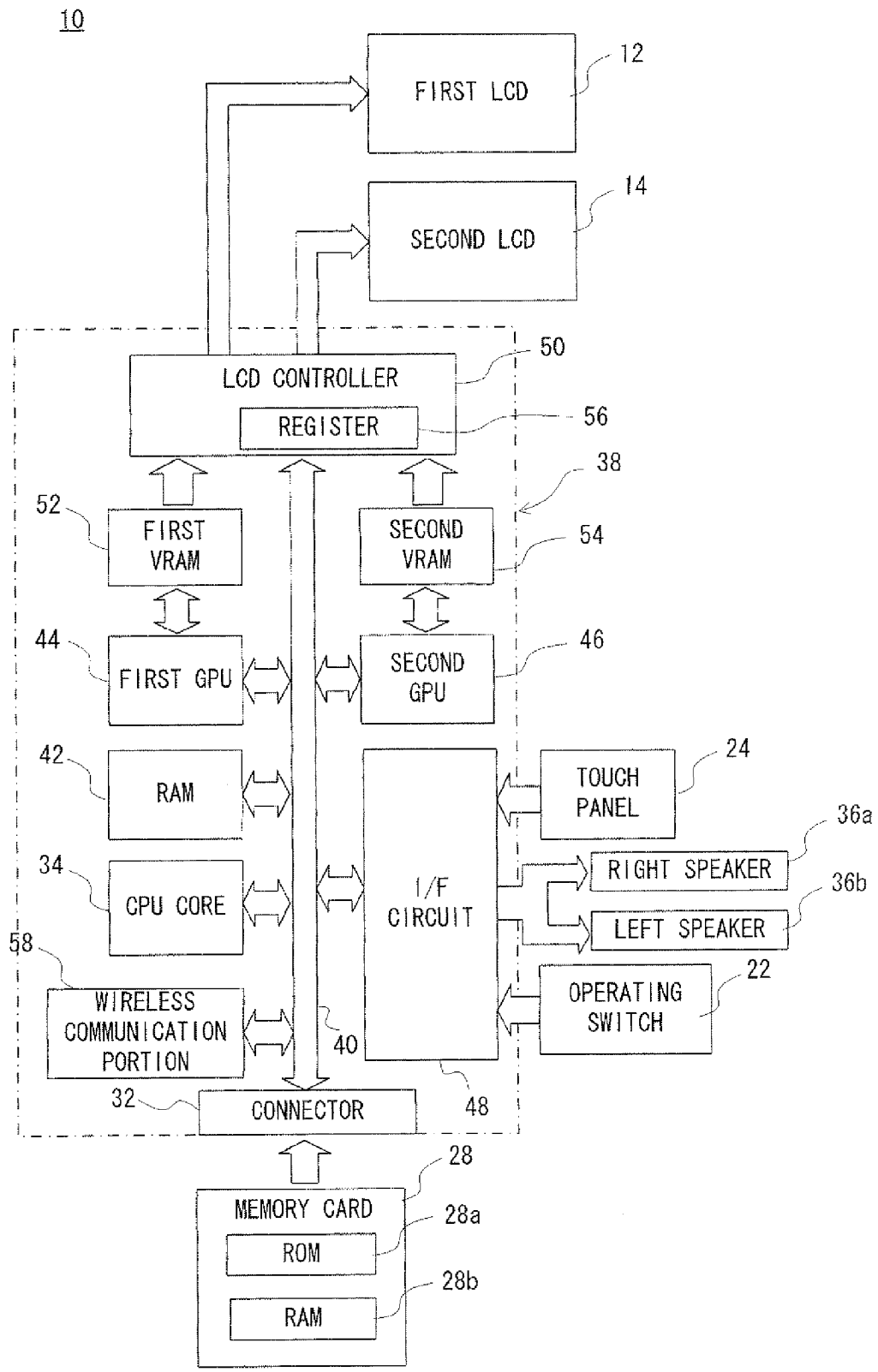
FIG. 2 is a block diagram showing an electric configuration of the game apparatus shown in FIG. 1.

FIG. 2 is a block diagram showing an electrical configuration of the game apparatus 10. Referring to FIG. 2, the game apparatus 10 includes an electronic circuit board 38, and on the electronic circuit board 38, circuit components, such as the CPU core 34, etc. are mounted. The CPU core 34 is connected with the above-described connector 32 via a bus 40, and is connected with a RAM 42, a first graphics processing unit (GPU) 44, a second GPU 46, an input-output interface circuit (hereinafter, referred to as "I/F circuit") 48, a wireless communication portion 58, and an LCD controller 50.

The connector 32 is detachably connected with the memory card 28 as described above. The memory card 28 includes a ROM 28a and a RAM 28b, and although illustration is omitted, the ROM 28a and the RAM 28b are connected with each other via a bus, and also connected with a connector (not shown) to be connected with the connector 32. Accordingly, the CPU core 34 gains access to the ROM 28a and the RAM 28b as described above.

The ROM 28a stores in advance a game program for a game to be executed by the game apparatus 10, image data (text and object image, background image, item image, icon (button) image, message image, etc.), data of the sound (music) necessary for the game (sound data), etc. The RAM (backup RAM) 28b stores (saves) proceeding data of the game, result data of the game, etc.

The RAM 42 is utilized as a buffer memory or a working memory. That is, the CPU core 34 loads the game program, the image data, the sound data, etc. stored in the ROM 28a of the memory card 28 into the RAM 42, and executes the loaded game program. The CPU core 34 executes a game processing while storing data (game data, flag data, etc.) temporarily occurring in correspondence with a progress of the game in the RAM 42.

It should be noted that the game program, the image data, the sound data, etc. are stored (loaded) from the ROM 28a entirely at a time, or partially and sequentially so as to be stored into the RAM 42.

Each of the GPU 44 and the GPU 46 forms a part of a rendering means, is constructed by, for example, a single chip ASIC, and receives a graphics command (rendering command) from the CPU core 34 to generate image data according to the graphics command. Additionally, the CPU core 34 applies an image generation program (included in the game program) required to generate the image data to both of the GPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain data (image data: polygon data, texture data, etc.) required to execute the rendering command.

It should be noted that the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "0". Additionally, the LCD controller 50 outputs the image data created by the GPU 44 to the LCD 14, and outputs the image data created by the GPU 46 to the LCD 12 in a case that the data value of the register 56 is "1".

Here, the LCD controller 50 can directly read the image data from the VRAM 52 and the VRAM 54, or read the image data from the VRAM 52 and the VRAM 54 via the GPU 44 and the GPU 46.

Wireless communication portion 58 has a function for connection to wireless LAN, for example, in compliance with IEEE 802.11 specifications. Wireless communication portion 58 is connected to CPU CORE 34. CPU CORE 34 can transmit and receive data to/from other equipment through the Internet by using wireless communication module 38.

The I/F circuit 48 is connected with the operating switch 22, the touch panel 24 and the right and left speakers 36a, 36b. Here, the operating switch 22 includes the above-described switches 22a, 22b, 22c, 22d, 22e, 22f, 22g, 22L and 22R, and in response to an operation of the operating switch 22, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game, such as a game music (BGM), a sound effect or voices of a game character (onomatopoeic sound), etc., and outputs the same from the speakers 36a, 36b via the I/F circuit 48.

Figure 3:
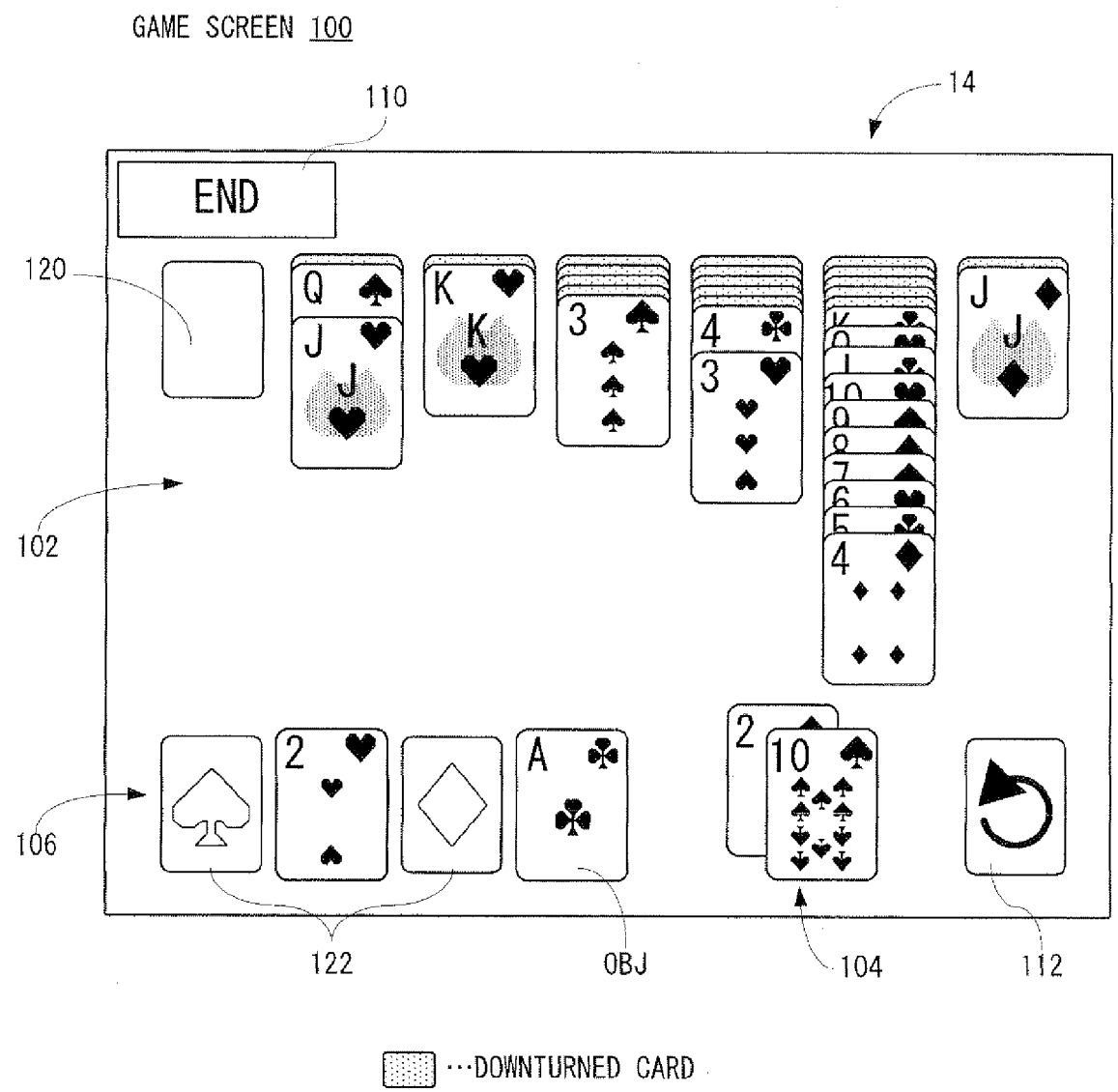
FIG. 3 is an illustrative view showing an example of a game screen of a virtual game to be displayed on an LCD of the game apparatus shown in FIG. 1.

FIG. 3 shows an example of the game screen 100 to be displayed on the LCD 14 in a case that a virtual game of this embodiment is played. On the game screen 100, a plurality of objects (card object) OBJ of cards are displayed. The game screen 100 shown in FIG. 3 is a screen for playing a card game called Klondike. As understood from FIG. 4(A), the game screen 100 is provided with a display region 102 to display a card object OBJ as a tableau pile, a display region 104 to display a card object OBJ as a stock, and a display region 106 to display a card object OBJ as a foundation.

Hereafter, the "card object OBJ" simply referred in this embodiment means a single or a plurality of card objects OBJ.

Furthermore, a button 110 is displayed at the upper left of the game screen 100, and a button 112 is displayed at the lower right thereof. The button 110 is a GUI (Graphical User Interface) to command a stop of the virtual game, and the button 112 is a GUI to reverse all the stocks.

In addition, in the display region 102 of the game screen 100, an approximately quadrangle frame (index frame) 120 to show a position (row) where the card object OBJ of a tableau pile is to be arranged is displayed. The index frame 120 is an index when a player moves and arranges the card object OBJ in a row where the card object OBJ of the tableau pile is not arranged, for example. On the game screen 100 shown in FIG. 3, only one index frame 120 is displayed, similarly, on the bottom of the tableau pile in each row, the index frame 120 is set (displayed).

In addition, on the display region 106 of the game screen 100, an approximately quadrangle frame (index frame) 122 to show a position where the card object OBJ of the foundation is to be arranged is displayed. In this index frame 122, out of the kinds of the card object OBJ, designs the same as the marks are displayed to clearly show the marks of the card objects OBJ that the user has to arrange. In this embodiment, the kind of the card object OBJ means marks (spades, diamonds, clovers, hearts, etc), and a numeric character (2-10) or an alphabetic character (A, J, Q, K). Furthermore, the alphabetic characters A, J, Q, and K respectively correspond to the numeric characters 1, 11, 12, and 13. Hereafter, the "numeric character" and the "alphabetic character" are collectively called "character".

On the game screen 100 shown in FIG. 3, the index frame 122 on which the design of spade is drawn and the index frame 122 on which the design of diamond is drawn are displayed. Similarly, the index frame 122 on which the design of heart is drawn, and the index frame 122 on which the design of clover is drawn are set (displayed) on the bottom side of the card object OBJ of the foundation.

Here, a simple explanation is made on a virtual game (card game) by utilizing the game screen 100. Here, an explanation is made on a case that Klondike of Solitaire is played as a card game. Although illustration is omitted, at the beginning of the virtual game, the tableau pile is classified into seven rows (groups), such as the first row (row (1)), the second row (row (2)), the third row (row (3)), the forth row (row (4)), the fifth row (row (5)), the sixth row (row (6)), the seventh row (row (7)) from left to right of the game screen 100.

Furthermore, the number of the card object OBJ is set to increase from the first row to the seventh row. For example, one card object OBJ is arranged in the first row, two card objects OBJ are arranged in the second row, three card objects OBJ are arranged in the third row, four card objects OBJ are arranged in the forth row, five card objects OBJ are arranged in the fifth row, six card objects OBJ are arranged in the sixth row, and seven card objects OBJ are arranged in the seventh row.

Furthermore, in each row, the foremost (top) card object OBJ is displayed to be upturned to allow the user to see the kind, and the rest of card object OBJ on the bottom side (card object OBJ below it) are displayed to be downturned so as not to allow the user to see the kind. Here, the card objects OBJ are overlaid so as to be displaced in relation to one another.

In addition, at the beginning of the virtual game, all the card object OBJ except for the tableau pile are displayed to be downturned as card objects OBJ of the stock on the display region 104.

Figure 4:
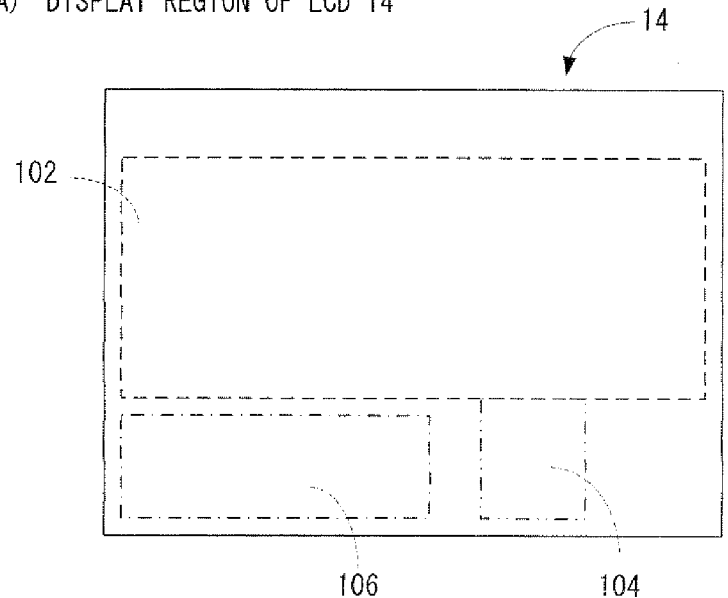
FIG. 4 is an illustrative view showing a display region of the LCD of the game apparatus shown in FIG. 1 and a game field.
Figure 4:
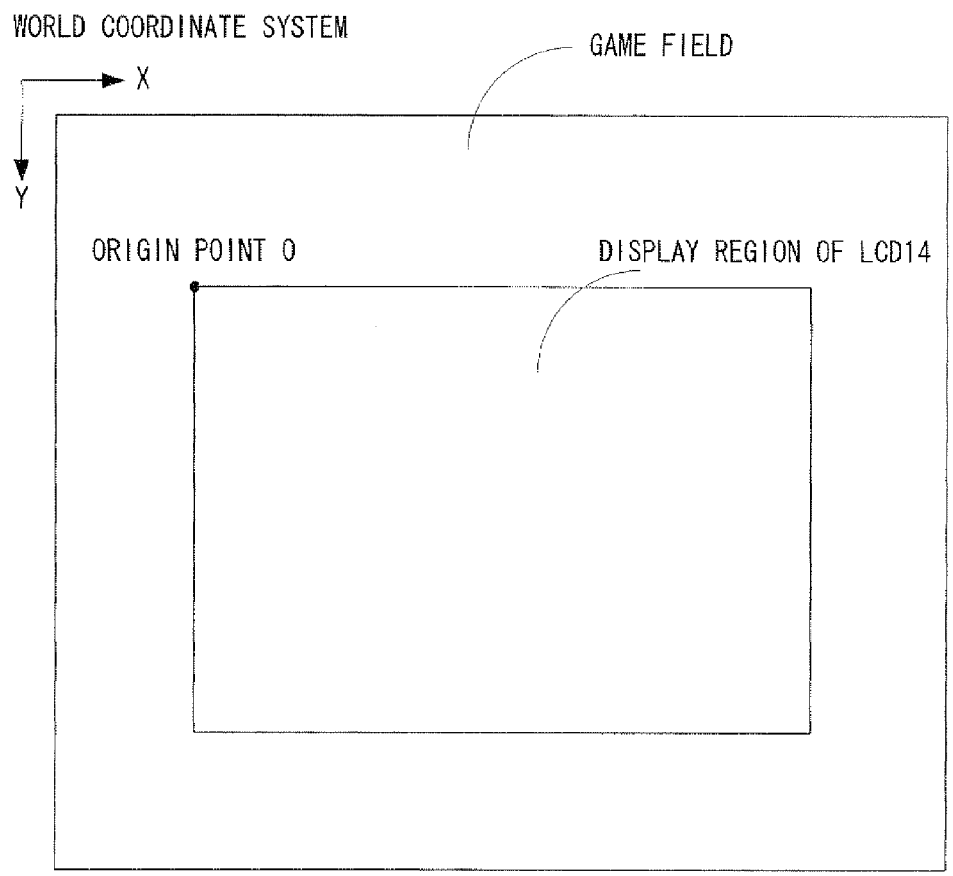

As shown in FIG. 4(B), in a two-dimensional or three-dimensional virtual space, a two-dimensional game field is provided, and within the game field, a display region of the LCD 14 is set. Thus, the reason why the game field is set to be larger than the display region of the LCD 14 is that depending on the progressing of the game, the card object OBJ may be off the display region of the LCD 14 (see FIG. 9, FIG. 11). In order to avoid this, it may be conceivable that the number of card objects OBJ arranged on the board is limited, and a total number of the card objects OBJ used in the virtual game is limited, but in such a case, the difficulty level of the game is lowered, and the player is tired of the game soon.

Additionally, as shown in FIG. 4(B), in the virtual space, a lateral direction (horizontal direction) is an X axis direction, and a vertical direction is a Y-axis direction, and the vertex at the upper left of the display region of the LCD 14 is set to be an origin point O of the world coordinate system. Here, as shown in FIG. 4(B), the right direction is a plus direction of the X-axis, and the downward direction is a plus direction of the Y-axis.

In the virtual game, a deck of cards, that is, 13 card objects OBJ from ace (A) to king (K) for each heart, spade, diamond, and clover are used (52 cards in total). Furthermore, the final object of the virtual game is to overlay the card objects OBJ with the same mark in ascending order as a foundation, and to complete a suit of 13 card objects OBJ for each four marks. Thus, the card object OBJ of the tableau pile is moved to a different row, the card object OBJ of the stock is moved to any row as a card object OBJ of the tableau pile, and the card object OBJ of the foundation is moved (returned) to any row as a card object OBJ of the tableau pile.

Here, the movement of the card object OBJ is restricted according to a predetermined rule. More specifically, in a case that the card object OBJ of the stock, the tableau pile or the foundation is moved to a desired row of the tableau pile (moved to another row in a case of the card object OBJ of the tableau pile), a card object OBJ having a color alternate to the foremost or top card object OBJ in the desired row and being small by one can be overlaid. For example, a heart or a diamond card object OBJ each being smaller by one from the numeric character of a spade or a clover card object OBJ can be overlaid on the spade or the clover card object OBJ. On the contrary thereto, a spade or a clover card object OBJ each being smaller by one from the numeric character of a heart or a diamond card object OBJ can be overlaid on the heart or the diamond card object OBJ.

Here, the card object OBJ to be moved is not restricted to one, and a plurality of card objects OBJ which are overlapped in alternate color in descending numeric order toward the foremost (top) can be moved at once. In such a case, the bottommost card object OBJ out of the plurality of card objects OBJ has to have a color alternate to the foremost card object OBJ in a desired row where the plurality of card objects OBJ are to be moved and has to be a numeric character smaller by one.

Although the difference in color cannot be represented in the drawing, in general, the marks and characters of the spade and clover card objects OBJ are drawn in black, and the marks and characters of the heart and diamond card objects OBJ are drawn in red. This holds true hereafter.

Additionally, in a case that no card object OBJ is displayed in the row of the tableau pile, the card object OBJ of K can be moved to that row (where the index frame 120 appears). It should be noted that a plurality of card objects OBJ including the card object OBJ of K which are overlaid according to the above-described predetermined rule (cards with a sequence of number in alternate color) can be moved to the row where the index frame 120 appears.

Although illustration is omitted, in a case that the card object OBJ of the stock, the tableau pile, or the foundation is moved to a row of the tableau pile, one or a plurality of card objects OBJ selected for movement may be referred to as a card object OBJ as a hand. In Klondike, a card object OBJ of the tableau pile which is displayed to be upturned, a card object OBJ of the stock which is displayed to be upturned at the topmost position, and a card object OBJ of the foundation which is displayed to be upturned at the topmost position are selectable as hands. If two or more card object OBJ of the tableau pile which are displayed to be upturned are overlaid, by selecting (touching) the desired card object OBJ out of the two or more card objects OBJ, and dragging it, the touched card object OBJ and the card objects OBJ placed above the touched card object OBJ can entirely be selected as hands.

In addition, if a card object OBJ of the stock or a card object OBJ of the tableau pile is moved as a card object OBJ of the foundation, a card object OBJ having the same mark as the card object OBJ displayed at the topmost of the group where the user wants to move and having a numeric character grater by one can be overlaid. Here, if no card object OBJ is displayed in a group, the card object OBJ of A having the mark the same as that displayed at the index frame 122 can be moved.

It should be noted that during the game, as a result of moving the card object OBJ of the tableau pile, in a case that the downturned card object OBJ is placed at the topmost position of the row of the tableau pile, by touching or clicking (designating) it, the topmost card object OBJ is displayed to be upturned. It should be noted that when a card object OBJ of the tableau pile displayed to be downturned is placed at the topmost position, this may be displayed to be upturned automatically.

Additionally, as understood from FIG. 3, in a case that the card object OBJ of the tableau pile is displayed, a space (space-a-between-Y-coordinates) in the Y-axis direction between the upper edge (top) of the overlaid card objects OBJ is calculated depending on the number of the card objects OBJ included in the row, and according thereto, a position in the Y-axis direction of each card object OBJ in the row is decided. This is because of displaying all the card objects OBJ included in the row.

Figure 5:
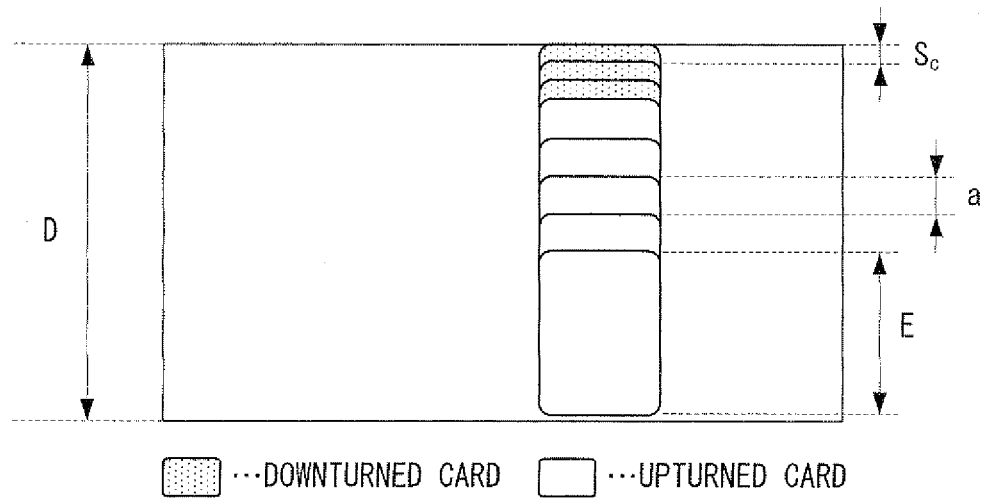
FIG. 5 is illustrative view showing a display method when card objects are displayed in a display region of a tableau pile on the LCD of the game apparatus shown in FIG. 1.

For example, as shown in FIG. 5, in the display region 102 of the tableau pile, a space-Sc-between-Y-coordinates of the downturned card objects OBJ and a space-a-between-Y-coordinates of the upturned card objects OBJ are decided.

Here, in FIG. 5 (this holds true in FIG. 7 to be described later), for simplicity, one row of the tableau pile is displayed, and the marks and the characters to be drawn on the front of the card object OBJ are omitted.

It should be noted that the downturned card object OBJ is only necessary to recognize that the object OBJ is downturned, and how many cards there are, so that the space-Sc-between-Y-coordinates is set to be fixed at a relatively short distance. On the other hand, the upturned card object OBJ is required to display so as to make the kind visible as much as possible, so that the space-a-between-Y-coordinates is variably set to ensure a distance as long as possible depending on the number of cards. Here, if the space-a-between-Y-coordinates is set to a long distance more than is necessary, the game screen 100 is hard to see, so that the upper limit of the space-between-Y-coordinates a is set to a maximum space So.

Noted that in this embodiment, the maximum space So is set to be a distance (length) such that marks and characters drawn on the upper edge part of a card object OBJ are not hidden under a card object OBJ overlaid above.

Accordingly, as shown in FIG. 5, in a case that five upturned card objects OBJ are overlaid above three downturned card objects OBJ, a length (D−3×Sc−E) obtained by subtracting the length of the space-Sc-between-Y-coordinates with respect to three sheet of downturned card objects OBJ and the length E in the Y-axis direction of the topmost card object OBJ from the length of the display region 102 of tableau pile in the Y-axis direction is uniformly divided by the five card objects OBJ. Noted that a distance shorter than one dot cannot be divided, so that the rest of the length (dot) when an equal division is made is a margin in the vertical direction of the display region 102 of the tableau pile (background is displayed).

Here, as shown in FIG. 3, in the sixth row, a relatively large number of card objects OBJ are displayed to be overlapped. The card objects of the tableau pile in the sixth row is more overlapped than those of the tableau pile in the second row and the tableau pile in the fifth row, so that the kind (content) of the card object OBJ below is hard to see due to the card object OBJ above it.

Accordingly, in this embodiment, in a case that the player touches the card object OBJ of the tableau pile, and if another card object OBJ is overlaid on the touched card object OBJ, all the card objects OBJ above the touched card object OBJ is moved downward. Thus, an exposed amount of at least the card object OBJ touched by the player (hereinafter referred to as "focused card object OBJ".) is made large, and the marks and characters of the focused card object OBJ can be viewed.

Figure 6:
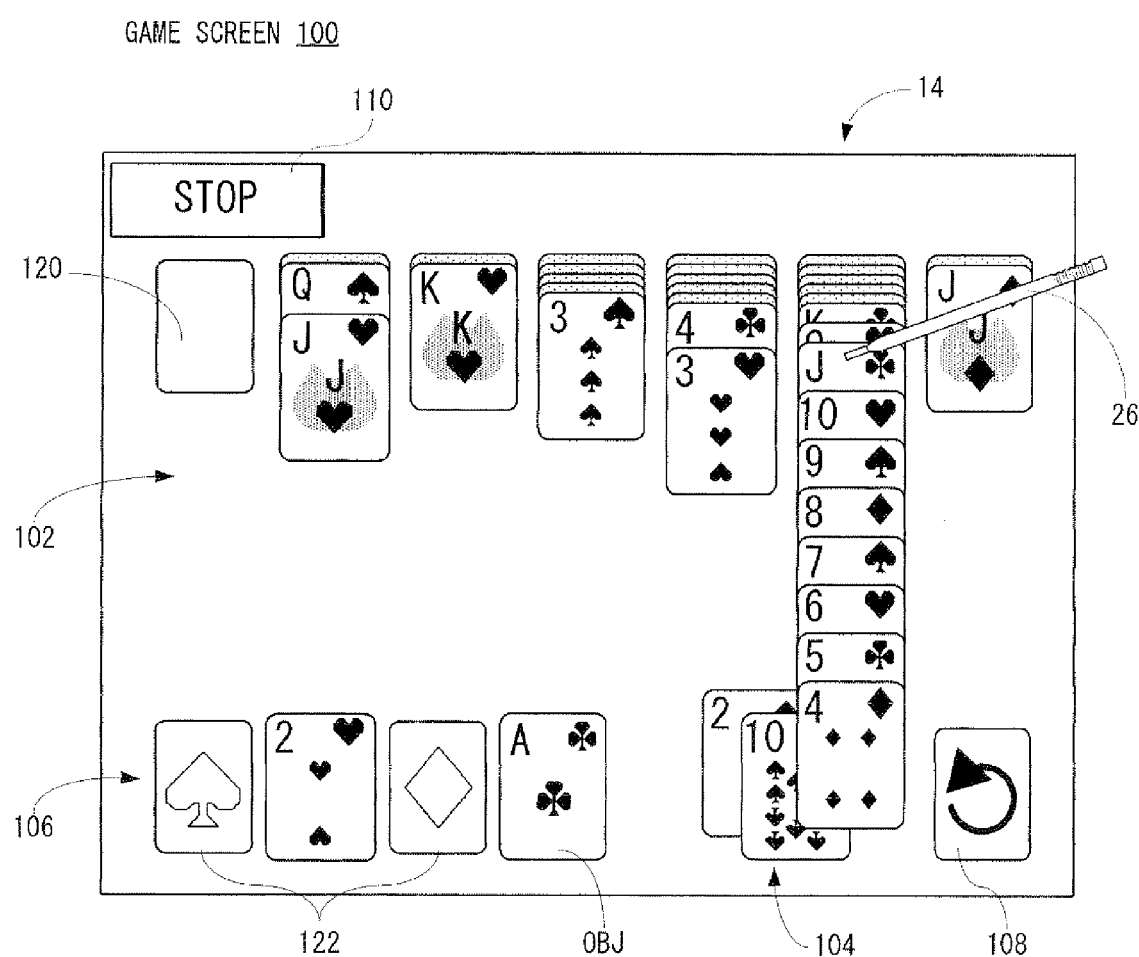
FIG. 6 is an illustrative view showing another example of the game screen of the virtual game to be displayed on the LCD of the game apparatus shown in FIG. 1.

In this embodiment, as shown in FIG. 6, in a case that a plurality of card objects OBJ are present in the row where the player touches, another card object OBJ is overlaid on the card object OBJ designated by a touch-on operation, and the overlapping amount is large, the touched card object OBJ and all the card objects OBJ overlaid above it are set to the maximum space So decided in advance.

Figure 7:
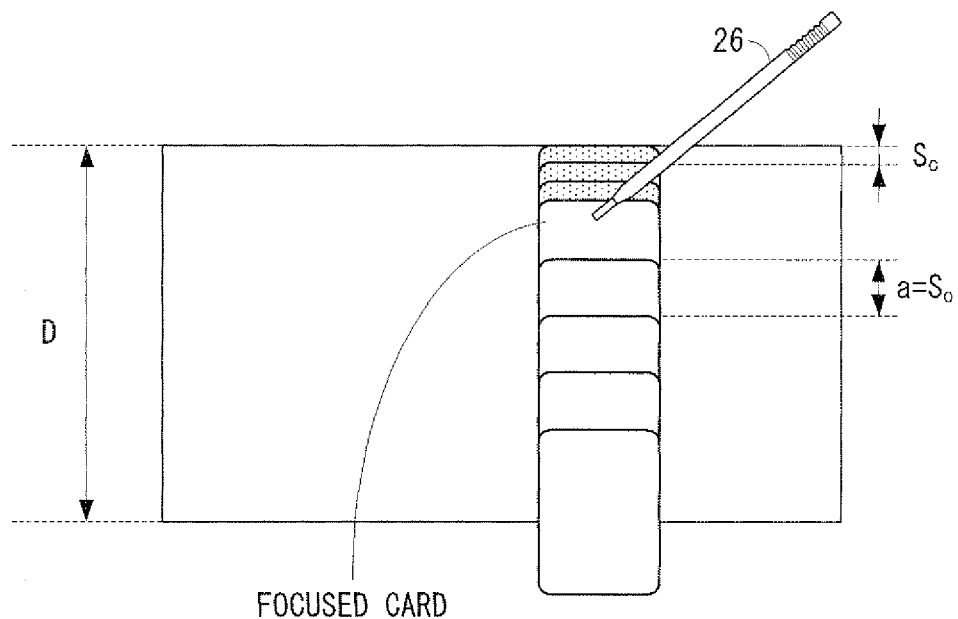
FIG. 7 is an illustrative view explaining a display control of the touched card object in the tableau pile and all the card objects above it.

More specifically, when the player performs a touch-on operation on the card object OBJ in the state shown in FIG. 5, regardless of the size (range) of the display region 102 of the tableau pile, all the card object OBJ overlaid above the touched card object OBJ are moved to set each of the space-a-between-Y-coordinates of the touched card object OBJ and the card objects OBJ overlaid above it to the maximum space So as shown in FIG. 7. Accordingly, the player can know the kind of at least the touched card object OBJ, that is, the focused card object OBJ.

Furthermore, in this embodiment, all the card object OBJ overlaid above the touched card object OBJ which are moved in order to set each of the space-a-between-Y-coordinates to the maximum space So in response to a touch-on operation are then moved (returned) to original positions after a certain period of time (60 frames in this embodiment) after the player performs a touch-off operation. That is, when a touch-off operation is performed in a situation shown in FIG. 6, the game screen 100 shown in FIG. 3 is displayed again. Here, the frame is a unit time for updating a screen, and one frame corresponds to $1/60$ seconds.

Figure 8:
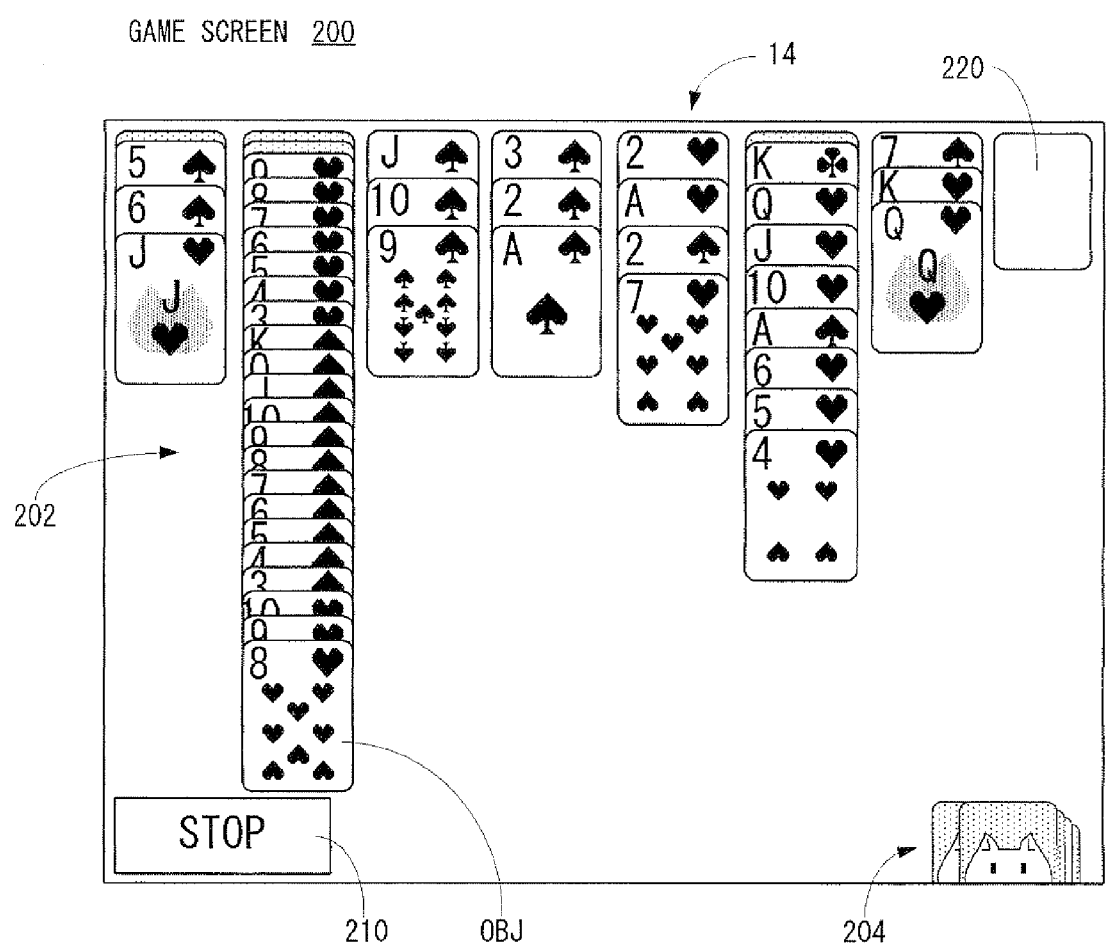
FIG. 8 is an illustrative view showing an example of a game screen of another virtual game to be displayed on the LCD of the game apparatus shown in FIG. 1.

FIG. 8 displays a game screen 200 to play another virtual game. This another virtual game is a card game called "Spider". As understood from FIG. 9, a display region 202 to display a card object OBJ as a tableau pile and a display region 204 to display a card object OBJ as a stock are provided on the game screen 200. The tableau pile is divided into a plurality of (8 in this embodiment) rows (groups), such as the first row (row (1)), the second row (row (2)), ..., the seventh row (row (7)), the eighth row (row (8)) from left to right of the game screen 200.

Figure 9:
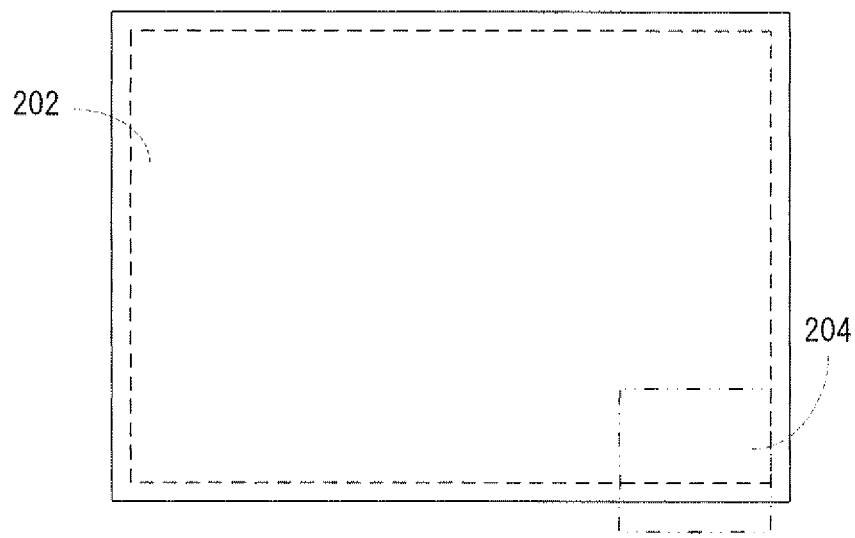
FIG. 9 is an illustrative view showing a display region of the LCD of the game apparatus shown in FIG. 1.

Although omitted in FIG. 9, as shown in FIG. 4(B), a game field is provided in the virtual space, and within the game field, a display region of the LCD 14 is set. Furthermore, with respect to the virtual space, the world coordinate system and the position of the origin point O of the display region of the LCD 14 are the same as those shown in FIG. 4(B).

Furthermore, on the game screen 200, a button 210 and an approximately quadrangle frame (index frame) 220 being an index to arrange the tableau pile are displayed. Although not displayed in FIG. 8, in another row of the tableau pile as well, the index frame 220 is displayed (set), and appears when a card object OBJ in the row is run out. The button 210 is a GUI to command (select) stop of the virtual game.

Here, in this embodiment, although illustration is omitted, a foundation produced as described later may be displayed between the button 210 and the display region 204 of the stock.

A simple explanation is made on this another virtual game. Although illustration is omitted, at the beginning of the game, a plurality of card objects OBJ are arranged in a plurality of rows as a tableau pile. Here, the number of card objects OBJ in each row may be the same or different. In addition, in each row, the topmost card object OBJ is displayed to be upturned, and the rest of the card objects OBJ below it are displayed to be downturned. All of the card objects OBJ other than the card object OBJ of the tableau pile are displayed to be downturned as a stock in the display region 204.

In this another virtual game, the final object of the game for the player is to produce sets of 13 card objects OBJ by overlaying the card object OBJ with the same mark from King to Ace in descending order in the row of the tableau pile, and to produce a predetermined number of sets (suits). Here, the predetermined number of sets is different depending on the number of sets of the cards to be utilized, and the number of sets of the cards to be utilized is variably set depending on a difficulty level of the game.

During the game, the player can move the card object OBJ of the tableau pile to a different row. Furthermore, in a case that the card object OBJ of the tableau pile cannot be moved, by clicking (touching) the card object OBJ of the stock, the stock can be added to each row of the tableau pile one by one. Here, in a case that the card object OBJ of the tableau pile is moved, the movement is restricted according to a predetermined rule (different from Klondike).

More specifically, in a case that the card object OBJ of the tableau pile is moved to another desired row, a card object OBJ having the same mark as that displayed at the topmost position of the desired row and having a numeric character smaller by "1" can be overlaid. Here, the card object OBJ to be moved is not restricted to one, and a plurality of card objects OBJ having the same mark and being continuous in number can be moved at once as well. In such a case, the bottommost card object OBJ out of the plurality of card objects OBJ has to have the same mark as the topmost card object OBJ in a desired row where the card objects OBJ are to be moved, and has to have a numerical character smaller by "1".

Here, the movable card object OBJ (selectable card object OBJ) is the topmost card object OBJ in each row of the tableau pile, and one or a plurality of card objects OBJ having the same mark as the topmost card object OBJ and having numerical characters continuously increasing by one toward the bottom. The selectable card object OBJ can be moved by partially being selected without being entirely selected.

However, in a case that discontinuity occurs in the middle of the row from the topmost card object OBJ due to the difference in mark or discontinuous numeric characters, even if the plurality of card objects OBJ having the same mark are overlaid toward the bottom in ascending numeric order below the discontinuity, these are not selectable card objects OBJ.

Furthermore, to the row where the card object OBJ is not displayed, that is, where the index frame 220 appears, any selectable card object OBJ can be freely moved regardless of the kind. Here, in a case that a plurality of card objects OBJ are moved to a row where the index frame 220 appears, the plurality of card objects OBJ has to be overlaid with each other so as to have the same mark and have numerical characters increasing by one toward the bottom.

In this another virtual game, in a case that all or a part of the selectable card object OBJ are selected to be moved, the selected one or plurality of objects OBJ is the object OBJ as a hand.

In this another virtual game as well, similar to the above-described virtual game, out of a plurality of card objects OBJ, the downturned card objects OBJ are arranged at a space-Sc-between-Y-coordinates fixedly set, and the upturned card objects OBJ are arranged at the calculated space-a-between-Y-coordinates (maximum space So) as described above. Accordingly, as shown in the second row of the tableau pile on the game screen 200 in FIG. 8, when a relatively large number of card objects OBJ are displayed in the row, the space-a-between-Y-coordinates becomes narrow, that is, a overlapping degree is made large to thereby make it difficult to see the kind of the card object OBJ.

Thus, in this another virtual game as well, when the player touches a desired card object OBJ, the space-a-between-Y-coordinates of the card objects OBJ overlaid above the touched card object OBJ is set to the maximum space So regardless of the size of the display region 202. Accordingly, as shown in FIG. 10, for example, the player can see the kind of at least the touched card object OBJ, that is, the focused card object OBJ on the game screen 200.

Figure 10:
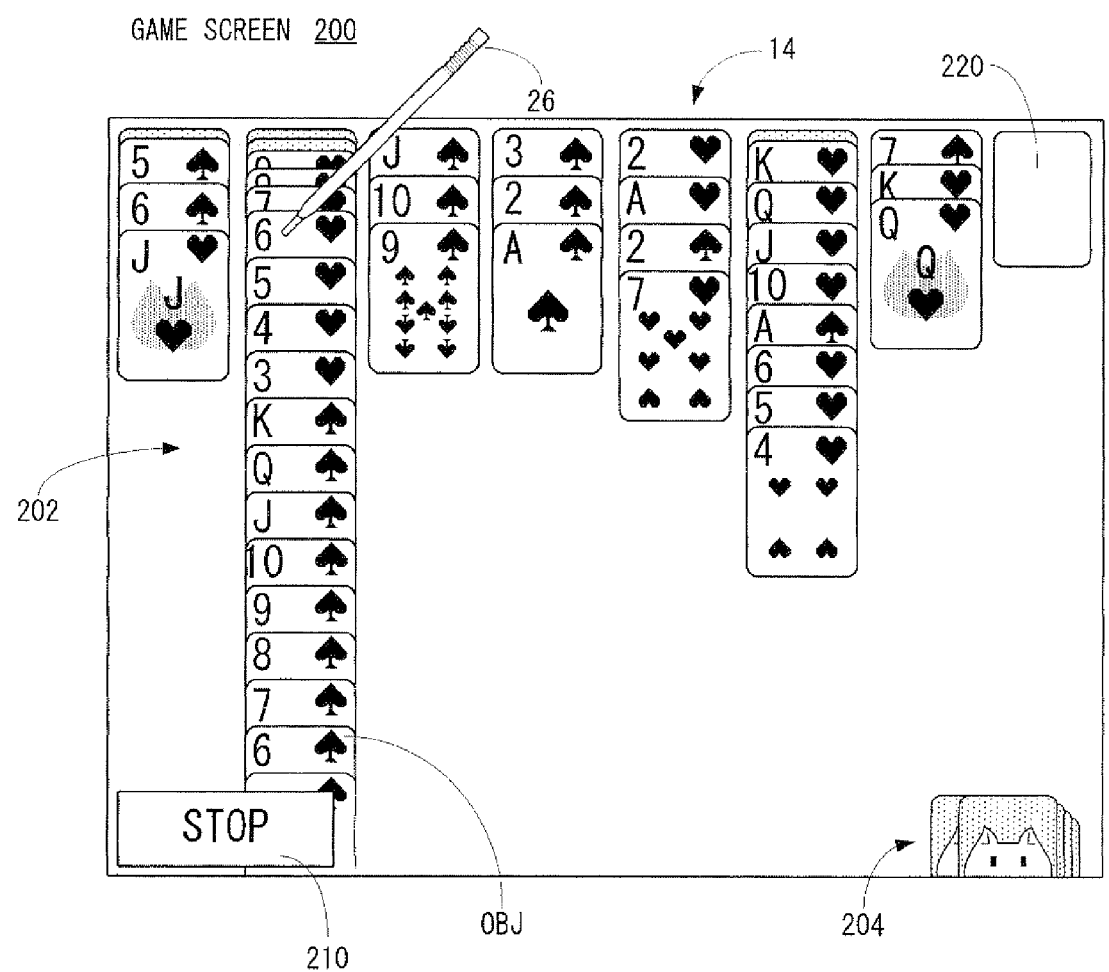
FIG. 10 is an illustrative view showing a second example of the game screen of this another virtual game displayed on the LCD of the game apparatus shown in FIG. 1.

It should be noted that as can be understood from FIG. 10, the card object OBJ which extends off the game screen 200 cannot be viewed, but it is conceivable that the card object OBJ that the player wants to see is the touched card object OBJ, so that there is no harm.

Figure 11:
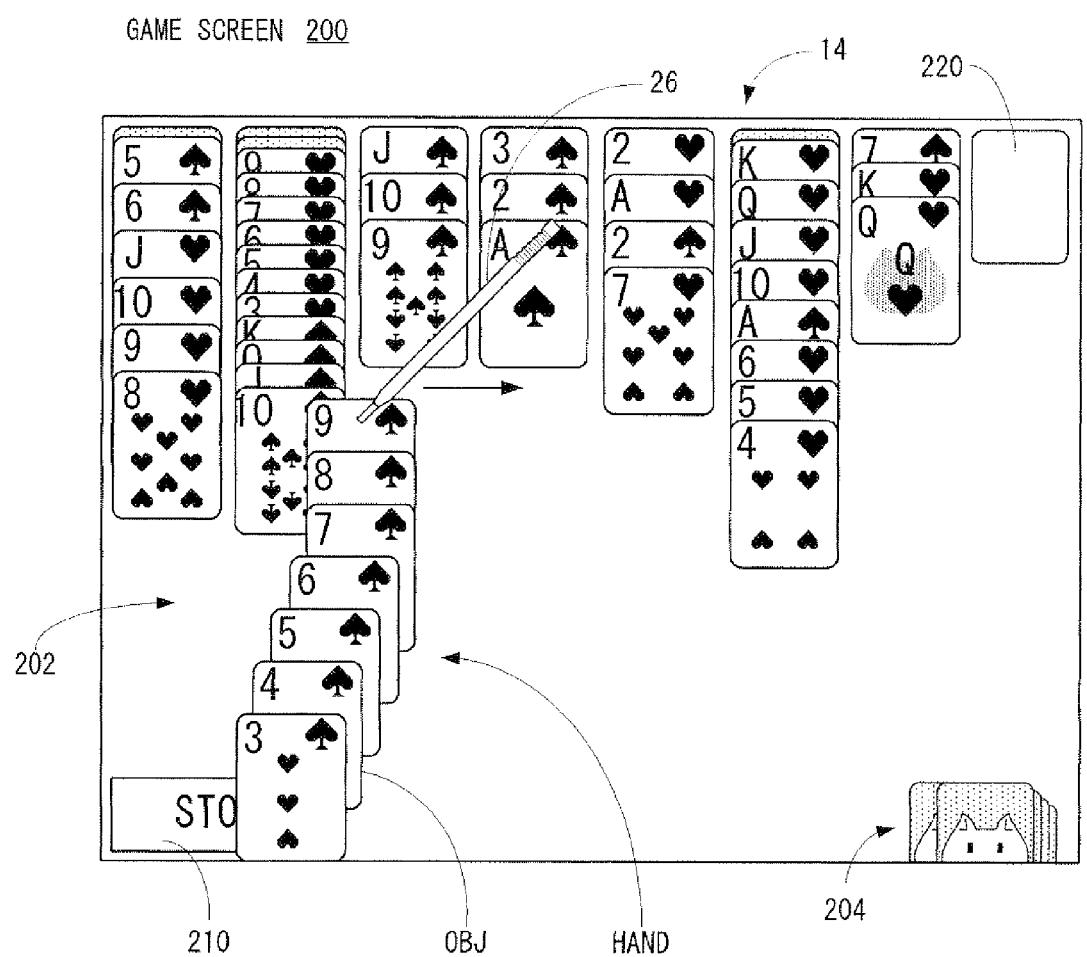
FIG. 11 is an illustrative view showing a third example of the game screen of this another virtual game displayed on the LCD of the game apparatus shown in FIG. 1.

FIG. 11 shows another example of the game screen 200. The game screen 200 shows a situation in which the player moves a plurality of card objects OBJ (card object OBJ as a hand) by performing a dragging operation (sliding operation) with the use of the stick 26.

As understood from FIG. 11, in a case that the plurality of card objects OBJ are moved, a movement control is made such that a part of the card objects OBJ overlaid on the touched card object OBJ are moved later one by one. This is because of smoothly representing the movement of the card objects OBJ to thereby facilitate visualization for the player.

Although illustration is omitted, in a case that a card object OBJ as a hand is moved in the above-described virtual game (Klondike) as well, a similar movement control is executed.

In this embodiment, a desired card object OBJ out of the selectable card objects OBJ is touched, and then, the card object OBJ as a hand is selected according to a dragging operation. Here, as described above, in a case that a card object OBJ having a different mark or having a numeric character not being continuously greater occurs in the middle of the row from the topmost position to the bottommost position of the row of the tableau pile, even if a plurality of card objects OBJ having the same mark are overlaid in ascending numeric order below the discontinuity, these cannot be moved. That is, it is impossible to select them as card objects OBJ as hands.

Figure 12:
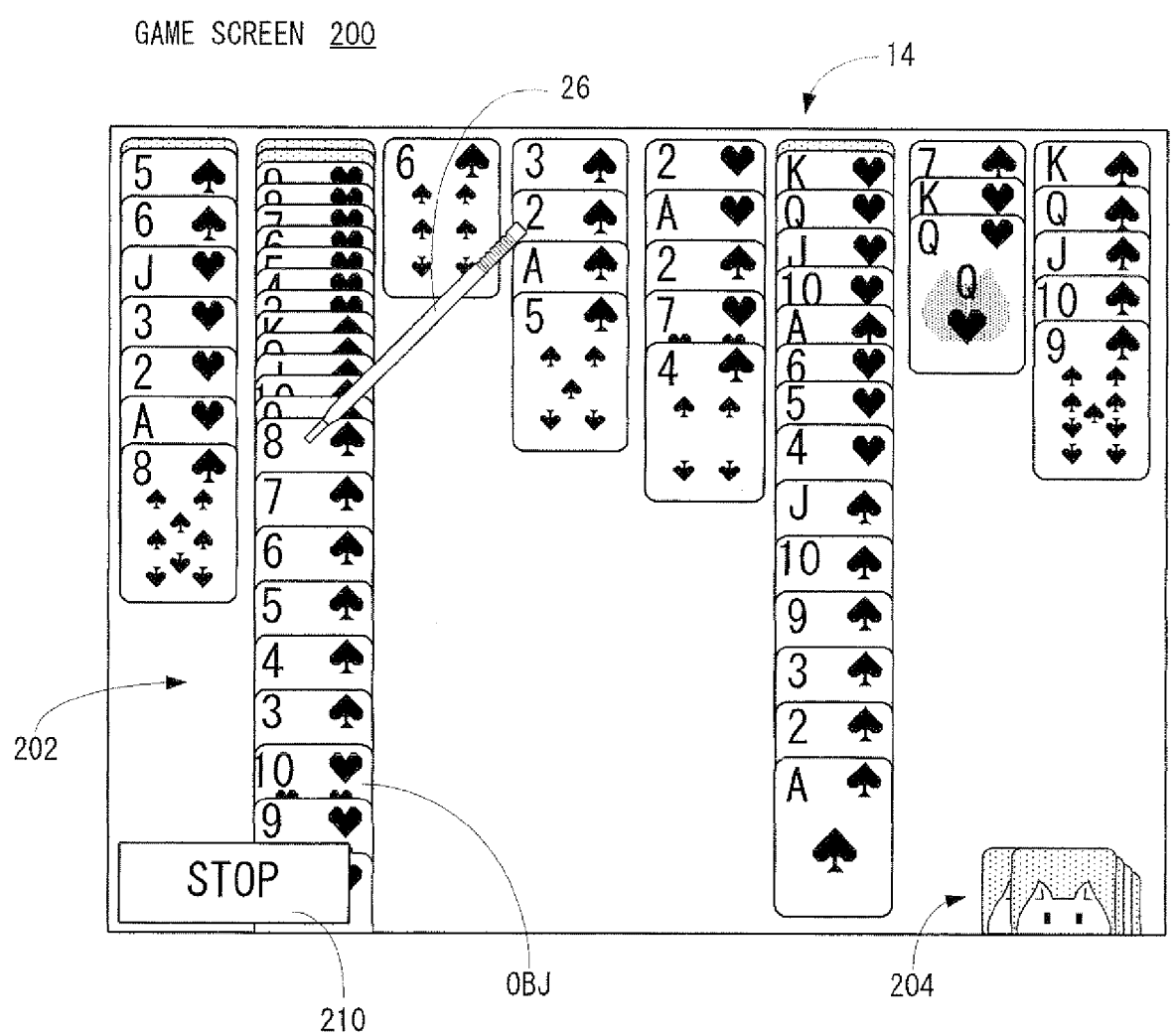
FIG. 12 is an illustrative view showing a fourth example of the game screen of this another virtual game displayed on the LCD of the game apparatus shown in FIG. 1.
Figure 13:
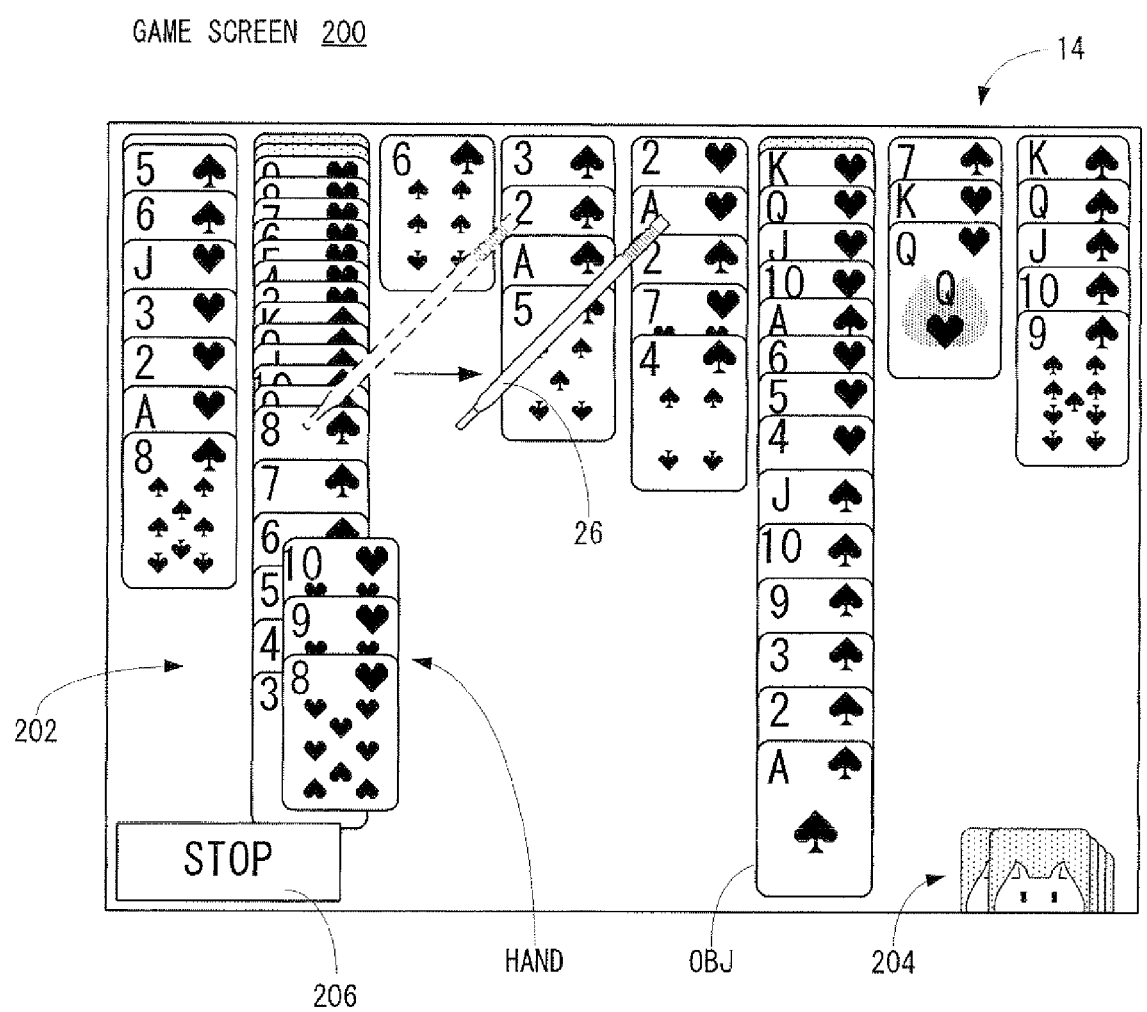
FIG. 13 is an illustrative view showing a fifth example of the game screen of this another virtual game displayed on the LCD of the game apparatus shown in FIG. 1.

For example, as shown in FIG. 12, when the player performs a touch-on operation on a desired card object OBJ, and then performs a dragging operation as shown in FIG. 13, not the touched card object OBJ but the selectable card object OBJ is selected as a hand according to the dragging operation.

On the game screen 200 shown in FIG. 12 and FIG. 13, in the row that the player touches, a card object OBJ of 8 of hearts is displayed at the topmost position, and below it, card objects OBJ of 9 and 10 of hearts are continuously arranged. Furthermore, below the card object OBJ of 10 of hearts, a card object OBJ of 3 of spades is arranged. Accordingly, according to the aforementioned predetermined rule (having the same mark and continuous numeric character), the selectable card object OBJ is the three card objects OBJ of 8 to 10 of hearts.

Accordingly, as shown in FIG. 13, when the player performs a touch-on operation on the card object OBJ of 8 of spades, and then performs a dragging operation, the three card objects OBJ of 8 to 10 of hearts are selected as hands. That is, the card object OBJ of 8 of spades on which the player performs a touch-on operation is not a selectable card object OBJ, and thus cannot be selected as a hand.

Here, as shown in FIG. 11, in a case that the topmost card object OBJ to the touched card object OBJ in the row are arranged according to the predetermined rule, it is possible to regard the plurality of card objects OBJ including the touched card object OBJ as hands. However, as shown in FIG. 12 and FIG. 13, in a case that a difference in mark and a discontinuous numeric character occur in the middle of the row from the topmost card object OBJ to the touched coordinate, selectable card objects OBJ between the topmost card object OBJ and the touched coordinate in the row without including the touched card object OBJ are selected as hands. That is, out of the selectable card objects OBJ, the card object OBJ closest to the touched coordinate and the card object OBJ in associated with it (overlaid according to the predetermined rule) are selected as hands.

Furthermore, as described above, when the player touches a card object OBJ in a certain row, each of the space-a-between-Y-coordinates of the touched card object OBJ and the card object OBJ overlaid above the touched card object OBJ is set to the maximum space So. However, this is limited to a case that the space-a-between-Y-coordinates is less than the maximum space So. Thus, as shown in FIG. 12, a part of the row extends off the game screen 200. In such a case, as shown in FIG. 13, it is possible to select a hand by a dragging operation. That is, the player can select even a hidden card object OBJ as a hand.

Although it is difficult to be understood in FIG. 12 and FIG. 13, in this embodiment, in a case that the touched card object OBJ and the card object OBJ selected as a hand are different, and the touched coordinate when the hand is selected and the card object OBJ as a hand are far away from each other, the card object OBJ as a hand is set to be gradually closer to the touched coordinate by the following processing (hand updating processing described later). Accordingly, even if the card object OBJ which extends off the game screen 200 is selected as a hand, this can be displayed on the game screen 200 by the hand updating processing.

In addition, in the card game (Klondike and Spider) of this embodiment, out of the card object OBJ of the tableau pile, by touching the upturned card object OBJ, each of the space-a-between-Y-coordinates of the touched card object OBJ and the card object OBJ above the touched card object OBJ is set to the maximum space So. On the other hand, in a case that the downturned card object OBJ out of the card object OBJ of the tableau pile is touched, similar to the case that the upturned card object OBJ is touched, processing (tableau pile updating processing described later) for focusing on the touched downturned card object OBJ is executed. However, during focusing, the space Sc-between-Y-coordinates is not changed with respect to the downturned card object OBJ. Accordingly, in such a case, the space-a-between-Y-coordinates of the upturned card object OBJ overlaid above the downturned card objects OBJ is set to the maximum space So.

Figure 14:
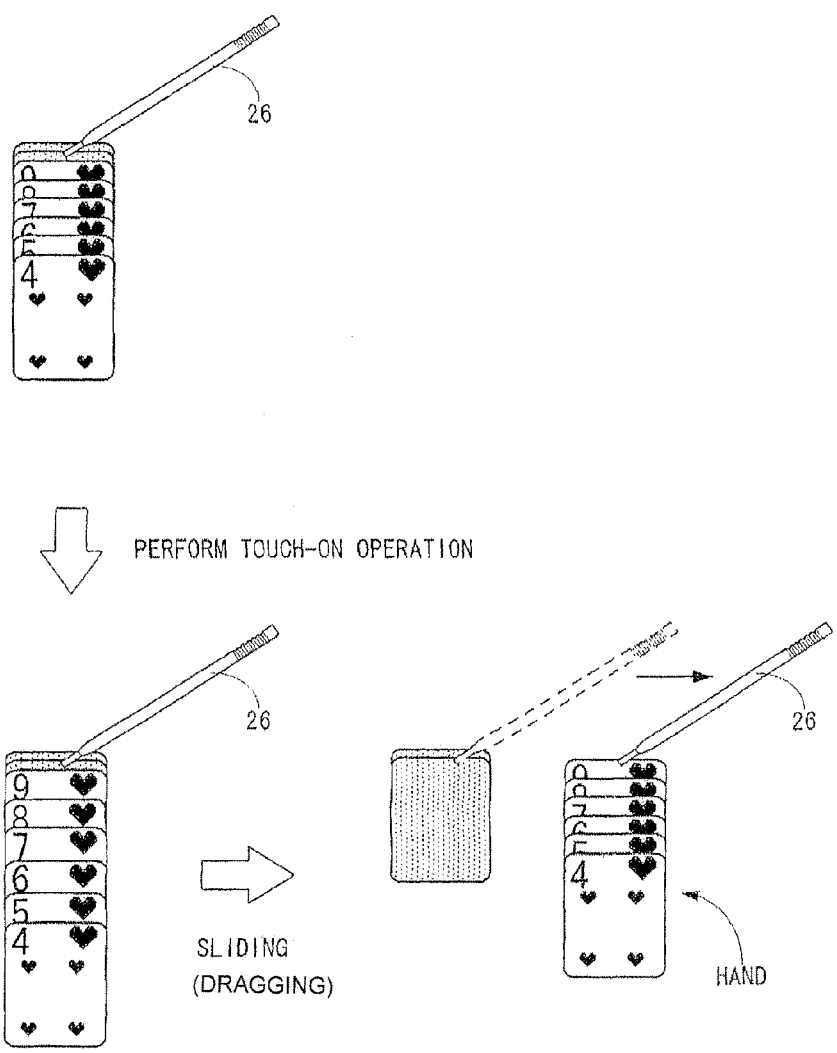
FIG. 14 is an illustrative view showing an example of a movement control of the card objects in a case that the card object is touched and dragged in the virtual game of this embodiment.

Thus, as shown in FIG. 14, in a case that the downturned card object OBJ of the tableau pile is touched, each of the space-a-between-Y-coordinates of the upturned card objects OBJ overlaid above the touched card object OBJ is set to the maximum space So, capable of making the kind of the upturned card objects OBJ visible.

Succeedingly, when the player performs a dragging operation, a card object OBJ as a hand is selected. Here, as described above, in FIG. 14, since the downturned card object OBJ is touched, that is, the non-selectable card objects OBJ is touched, so that a card object OBJ as a hand cannot be directly selected. In this embodiment, in such a case, a card object OBJ as a hand is automatically selected from the selectable card objects OBJ. In FIG. 14, since all the upturned card objects OBJ are overlapped according to the predetermined rule and thus are the selectable card objects OBJ, all these card objects OBJ are selected as hands. At this time, as understood from FIG. 14 as well, the card object OBJ as hands move to stick to the touched coordinates.

Figure 15:
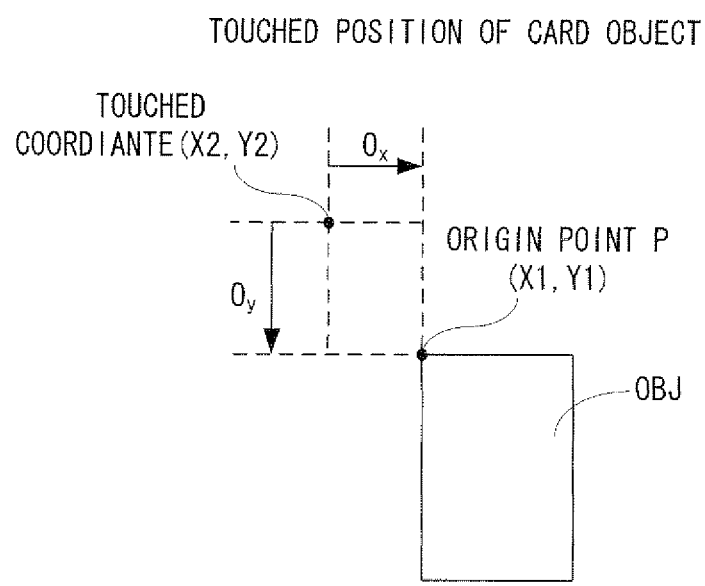
FIG. 15 is an illustrative view showing a distance between an origin point of the card object and touched coordinate in the virtual game of this embodiment.

Furthermore, in the card game (Klondike and Spider) of this embodiment, as shown in FIG. 15, with respect to each card object OBJ, the upper left vertex is set as a reference point, that is, as an origin point P. Accordingly, the card object OBJ is arranged in the game field such that the origin point P is positioned in an arrangement position in a world coordinate system.

Additionally, in a case that the card object OBJ continues to be touched, a positional relationship (distance) between the touched coordinate and the card object OBJ is stored. For example, as shown in FIG. 15, the distance (Ox, Oy) between the touched coordinate and the origin point P of the card object OBJ is stored. The reason why the distance (Ox, Oy) between the touched coordinates and the origin point P of the card object OBJ is stored is that a movement control is performed on the card object OBJ according to a dragging operation (touched coordinate) described later. Although illustration is omitted, in a case that the card object OBJ itself is touched as well, the distance (Ox, Oy) is stored.

Specifically, as shown in FIG. 15, the distance (Ox, Oy) is calculated by subtracting touched coordinate (X2, Y2) from the coordinate of the origin point P (X1,Y1). That is, Ox=X1−X2, and Oy=Y1−Y2.

Figure 16:
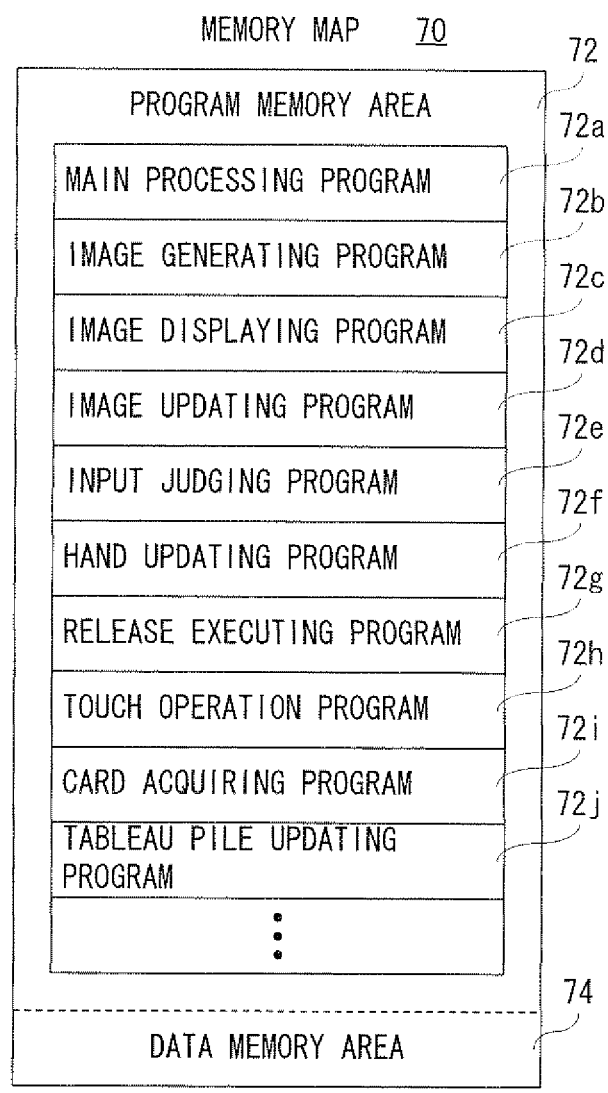
FIG. 16 is an illustrative view showing a memory map of a RAM 42 shown in FIG. 2.

FIG. 16 is a memory map 70 of the RAM 42 of the game apparatus 10 shown in FIG. 2. The RAM 42 includes a program memory area 72 and a data memory area 74. The program memory area 72 stores a game program as an information processing program, and the game program is constructed by a main processing program 72a, an image generating program 72b, an image displaying program 72c, an image updating program 72d, an input judging program 72e, a hand updating program 72f, a release executing program 72g, a touch operation program 72h, a card acquiring program 72i and a tableau pile updating program 72j, and so on.

The main processing program 72a is a program for processing a main routine of the virtual game of this embodiment. The image generating program 72b is a program for generating a game image by utilizing the image data 74b described later. The image displaying program 72c is a program for displaying a game image generated according to the image generating program 72b as a game screen (100, 200) on the LCD 14 (or LCD 12). The image updating program 72d is a program for updating the game image (game screen) generated according to the image generating program 72b and displayed according to the image displaying program 72c at regular time intervals (one frame).

The input judging program 72e is a program for determining an input operation by the player. In this embodiment, it is determined whether or not a touch-on operation is performed, whether or not a touch-off operation is performed, and whether or not a dragging operation is performed. The hand updating program 72f is a program for updating the position of the card object OBJ as a hand of the world coordinate system. In this embodiment, the hand updating program 72f updates coordinate (world coordinate) of a card object OBJ as a hand according to touched coordinate. In a case of one card object OBJ as a hand, the card object OBJ as a hand is moved according to the touched coordinate. Furthermore, in a case of a plurality of card objects OBJ as hands, the bottommost card object OBJ out of the plurality of card objects OBJ is moved according to the touched coordinate, and each of the card objects OBJ above the bottommost card object OBJ is moved to follow the card object OBJ immediate above.

The release executing program 72g is a program for returning a card object OBJ as a hand to an original position as a card object OBJ of the tableau pile. In this embodiment, when a player performs a touch-off operation during dragging of a card object OBJ as a hand, by determining that the card object OBJ as a hand is released, the card object OBJ as a hand is moved to the original row (position) of the tableau pile. Although detailed explanation is omitted, even when a card object OBJ as a hand is selected from the card object OBJ of the tableau pile, the information as a tableau pile is stored in position data of the card data 74c (see FIG. 17) without being erased. Accordingly, when the player releases the card object OBJ as a hand, it is returned to the original position according to the card data 74c. At this time, a card object OBJ as a hand is moved such that the distances (spaces) in the X axis direction and in the Y-axis direction are reduced at a predetermined ratio (25%, for example) from the current position to the original position. Here, the current position is updated for each frame. This holds true hereafter.

As described above, in a case of Klondike, the card object OBJ of the stock and the foundation can be selected as card objects OBJ as hands, this is not an essential content of the present invention, and thus omitted hereafter. Similarly, as to the movement of the card object OBJ when it is released, this is not an essential content of the present invention, and thus omitted hereafter. In a case that a card object OBJ of the stock is selected as the card object OBJ as a hand, the released card object OBJ is returned to the topmost position as a stock. Furthermore, in a case that a card object OBJ of the foundation is selected as the card object OBJ as a hand, the released card object OBJ is returned to the topmost position of the original group.

The touch operation program 72h is a program for setting the card object OBJ of the tableau pile selected by the player as a focused card object OBJ, and setting a predetermined amount of time (60 frames in this embodiment) during which a focusing is performed to the focus counter 74j (see FIG. 17) described later.

The card acquiring program 72i is a program for selecting a card object OBJ as a hand from the card object OBJ of the tableau pile according to an input operation by the player. As described above, one on the topmost or the plurality of card objects OBJ overlaid above it out of the selectable card objects OBJ in the row of the tableau pile which the player touches is selected as a hand in response to a dragging operation followed by a touch-on operation.

The tableau pile updating program 72j is a program for vertically moving an arrangement position of the card object OBJ of the tableau pile for each row as required. More specifically, all the card objects OBJ above the touched card object OBJ are moved downward such that each of the space-a-between-Y-coordinates of the touched card object OBJ and the card object OBJ above the touched card object OBJ is set to the maximum space So. Furthermore, when a certain period of time (60 frames in this embodiment) elapses after the player performs a touch-off operation, all the card objects OBJ about which each of the space a-between-Y-coordinates is forcedly set to the maximum space So in order to focus the touched card object OBJ are moved upward to be returned to the original arrangement.

Here, as described in the tableau pile updating processing described later, in a case that the card objects OBJ of the tableau pile are moved upward as well, the space between a target (after movement) position coordinate and a current position coordinate (current position) is controlled to be shortened at a predetermined ratio (25% in this embodiment). This makes it possible to show that the card objects OBJ are smoothly moved when a desired card object OBJ is focused or when the focus is ended as well as the card object OBJ as a hand is dragged or released.

Although illustration is omitted, the game program includes a sound outputting program, a backup program, etc. The sound outputting program is a program for producing or outputting sound (music) necessary for the game, such as sound effect, voice (onomatopoeic sound), BGM, etc. The backup program is a program for saving the game data (proceeding data, result data) stored in the RAM 28b of the memory card 28.

Figure 17:
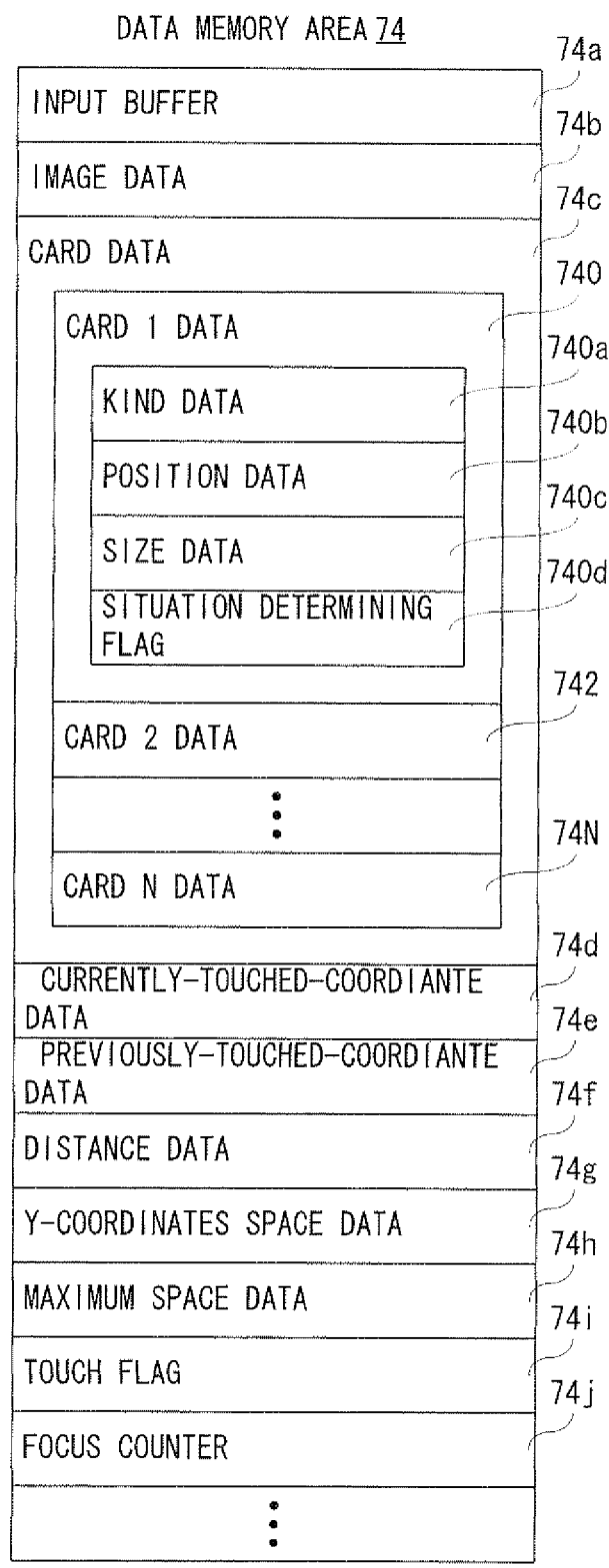
FIG. 17 is an illustrative view showing a detail of the content of a data memory area shown in FIG. 16.

FIG. 17 is an illustrative view showing a detail of the content of a data memory area 74 shown in FIG. 16. As shown in FIG. 17, the data memory area 74 is provided with an input buffer 74a. Furthermore, the data memory area 74 stores image data 74b, card data 74c, currently-touched-coordinate data 74d, previously-touched-coordinate data 74e, distance data 74f, Y-coordinate space data 74g, and maximum space data 74*h*. In addition, the data memory area 74 is provided with a touch flag 74*i* and a focus counter 74*j*.

The input buffer 74*a* temporarily stores in chronological order key data input from the operating switch 22 and coordinate data output from the touch panel 24. The key data and coordinate data are utilized in the game processing, and then deleted from the input buffer 74*a*.

The image data 74*b* is data, such as polygon data and texture data to generate a game image. The card data 74*c* is data with respect to each card object OBJ of all the card objects OBJ (N cards) existing in the game field. More specifically, the card data 74*c* includes card 1 data 740, card 2 data 742, ..., card N data 74N. As shown in FIG. 17, the card 1 data 740 includes kind data 740*a*, position data 740*b*, size data 740*c* and a situation determining flag 740*d*.

The kind data 740*a* is data for identifying the kind (mark and character) of the card object OBJ (card 1, here. This holds true below). The position data 740*b* includes discrimination data for discriminating among the card objects OBJ of the stock, the tableau pile, and the hand and coordinate data as to the world coordinate of the card object OBJ. Here, in this embodiment, the discrimination data includes not only information to discriminate among the stock, the tableau pile, the hand, but also information as to what number the card object OBJ is overlaid. In addition, the tableau pile stores information to discriminate between the row and the order in the row (number when the card objects OBJ are counted from the bottommost card object) because of being classified into rows. Furthermore, as described above, when the player releases the card object OBJ as a hand, this is returned to the card object OBJ as the tableau pile, and therefore, the information on the tableau pile is set not to be erased even when the card object OBJ is selected as a hand. Here, if the card object OBJ is moved to another row, the information of the hand is erased, and the information of the tableau pile (row and order) is updated.

The size data 740*c* is data indicating a size of the card object OBJ, and is specifically numerical value data as to horizontal and vertical lengths (the number of dots) of the card object OBJ. Here, the sizes of all the card objects OBJ utilized in the same virtual game are the same, and therefore, the size data 740*c* stores only one for the card data 74*c* without storing it for each card object OBJ. The situation determining flag 740*d* is a flag for determining whether the card object OBJ is downturned or upturned. More specifically, the situation determining flag 740*d* is constructed by one bit register. The situation determining flag 740*d* causes the register to set to a data value "0" when it is turned off (not established). On the other hand, the situation determining flag 740*d* causes the register to set to a data value "1" when it is turned on (established). Here, if the card object OBJ is downturned, the situation determining flag 740*d* is turned off, and if the card object OBJ is upturned, the situation determining flag 740*d* is turned on.

Although the detailed explanation is omitted, this holds true for the card 2 data 742, ..., card N data 74N.

Although detailed explanation is omitted, in the virtual game of this embodiment, the proceeding of the game can be returned by one step, and therefore, the movement history of the card object OBJ is actually stored, and when the step is returned by one, the movement history is adapted to be applied in the reverse direction.

The currently-touched-coordinate data 74*d* is coordinate data as to touched coordinates where the player touches at the current frame. In this embodiment, the coordinate data at the current frame temporarily stored in the input buffer 74*a* is copied, and stored in the data memory area 74 as a currently-touched-coordinate data 74*d*. In this embodiment, the currently-touched-coordinate data 74*d* is updated for each frame. However, if the player performs a touch-off operation, the coordinate data is not stored (input) to the input buffer 74*a*, and in such a case, NULL data is stored as currently-touched-coordinate data 74*d*.

The previously-touched-coordinate data 74*e* is coordinate data as to touched coordinate where the player touches at the frame previously before the current frame. In this embodiment, the previously-touched-coordinate data 74*e* is also updated for each frame. More specifically, as described above, the currently-touched-coordinate data 74*d* is updated for each frame, so that before the currently-touched-coordinate data 74*d* is updated, the copied one is temporarily stored in the data memory area 74 as previously-touched-coordinate data 74*e*.

The distance data 74*f* is numerical value data as to a distance (the number of dots) between the origin point P in the local coordinate system of the card object OBJ arranged at the bottommost position and touched coordinate touched to select a hand. Here, as described above, the distance indicated by the distance data 74*f* is indicated by the distance Ox in the X-axis direction and the distance Oy in the Y-axis direction. The Y coordinate space data 74*g* is numerical value data indicating a space-a-between-Y-coordinates (the number of dots) of the card objects OBJ overlaid for each row of the tableau pile. The maximum space data 74*h* is numerical value data indicating a maximum value (maximum space So) of the space-a-between-Y-coordinates.

The touch flag 74*i* is a flag for determining whether or not the player performs a touch-on operation on the touch panel 24, and constructed by one bit register. If the touch flag 74*i* is turned off, a data value "0" is set to the register, and if the touch flag 74*i* is turned on, a data value "1" is set to the register. Here, if the player does not perform a touch-on operation on (performs a touch-off operation on) the touch panel 24, the touch flag 74*i* is turned off, and if the player performs a touch-on operation on the touch panel 24, the touch flag 74*i* is turned on.

The focus counter 74*j* is a counter for counting a certain period of time during which the card object OBJ touched by the player is focused. In this embodiment, the focus counter 74*j* is a down counter to count a certain period of time (60 frames) from when the card object OBJ on which the player performs a touch-on operation is focused, and the player performs a touch-off operation. That is, the focus counter 74*j* is not counted down while the player continues to perform a touch-on operation.

Although illustration is omitted, the data memory area 74 stores other data, other flags, and other counters (timers) necessary for the game.

Figure 18:
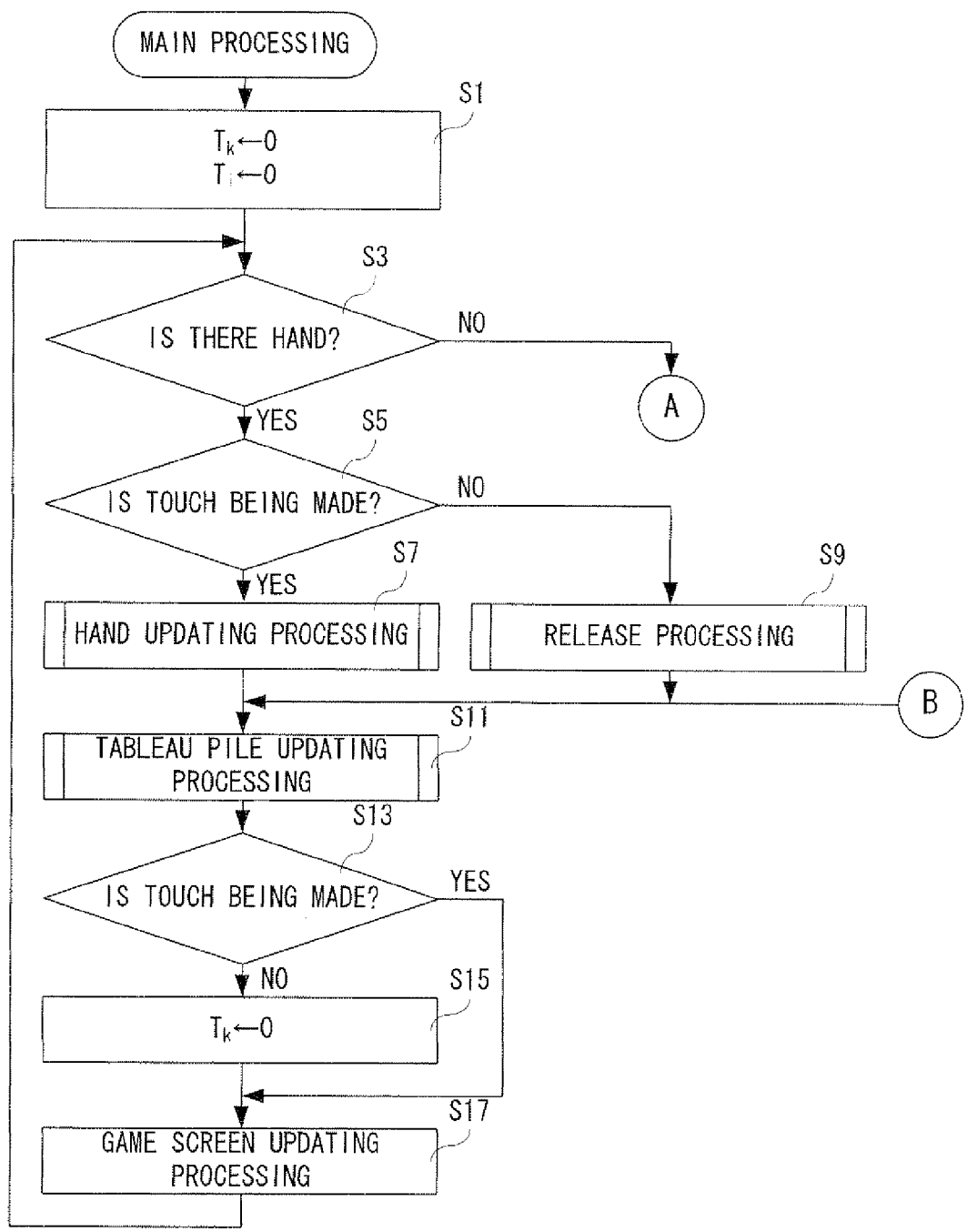
FIG. 18 is a flowchart showing a part of main processing by the CPU core shown in FIG. 2.
Figure 19:
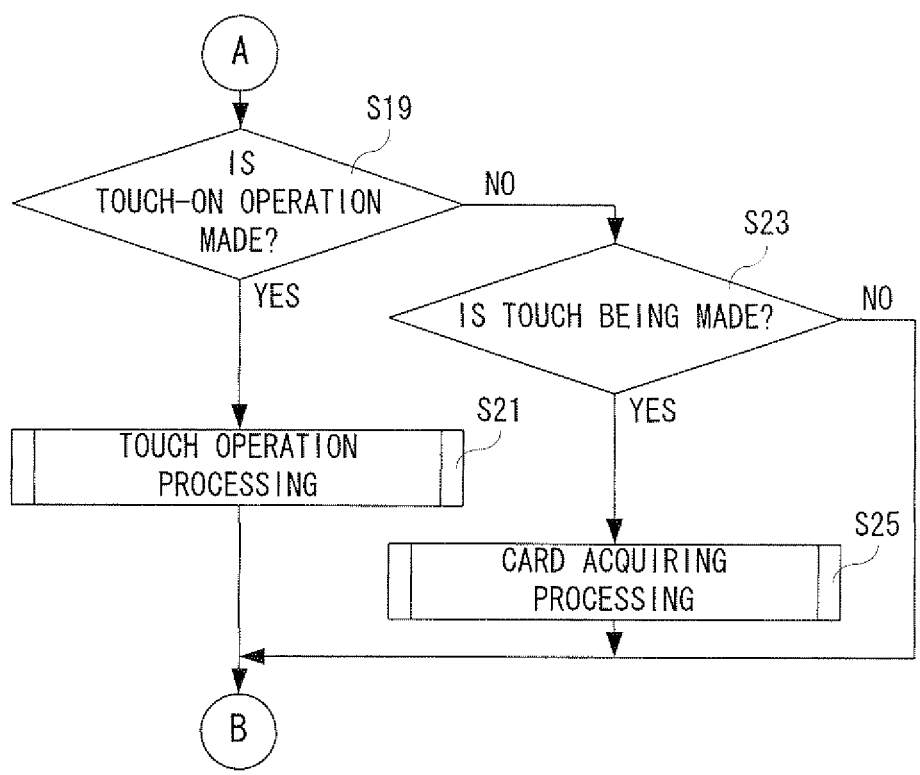
FIG. 19 is a flowchart showing another part of the main processing by the CPU core shown in FIG. 2.

FIG. 18 and FIG. 19 are flowcharts showing main processing of the CPU core 34 shown in FIG. 2. Although illustration is omitted, the CPU core 34 executes processing of detecting key data from the operating switch 22 and coordinate data from the touch panel 22 in parallel with the main processing. That is, the CPU core 34 stores in the input buffer 74*a* the key data from the operating switch 22 and the coordinate data from the touch panel 22 in chronological order.

As shown in FIG. 18, when starting the main processing, the CPU core 34 sets "0" to a variable Tk and a variable Ti in a step S1. Here, the variable Tk indicates the number of row (k) of the tableau pile which the player touches. Furthermore, the variable Ti indicates the number of the card object OBJ in the row that the player touches. Here, the number in the row is applied from the bottommost card (upper part of the game screen 100, 200) to the topmost card (lower part of the game screen 100, 200). Accordingly, in the step S1, a state that the player does not touch the card object OBJ of the tableau pile is set to the variable Tk and the variable Ti.

In a succeeding step S3, it is determined whether or not there is a hand. Here, the CPU core 34 determines whether or not there is a card object OBJ describing information on a hand in the position data (740*b*, etc.) with reference to the card data 74*c*. If "NO" in the step S3, that is, if there is no hand, the process proceeds to a step S19 shown in FIG. 19. On the other hand, if "YES" in the step S3, that is, if there is a hand, it is determined whether or not a touch is being made in a step S5. Here, the CPU core 34 determines whether or not a touch-on state continues. More specifically, the CPU core 34 determines whether or not the touch flag 74*i* is turned on, and the NULL data is not stored as currently-touched-coordinate data 74*d*.

Although detailed explanation is omitted, in this embodiment, at the beginning of the main processing, the touch flag 74*i* is turned off, and NULL data is stored as currently-touched-coordinate data 74*d* and previously-touched-coordinate data 74*e*.

If "YES" in the step S5, that is, if the touch flag 74*i* is turned on, and the NULL data is not stored as currently-touched-coordinate data 74*d*, it is determined that the hand is being touched, and in a step S7, hand updating processing (see FIG. 20) described later is executed, and the process proceeds to a step S11. On the other hand, if "NO" in the step S5, that is, if the touch flag 74*i* is turned on, but the NULL data is stored as currently-touched-coordinate data 74*d*, it is determined a touch off operation is made, and in a step S9, release processing (see FIG. 21) described later is executed, and the process proceeds to the step S11.

Although illustration is omitted, when "NO" is determined in the step S5, the touch flag 74*i* is turned off.

In the step S11, tableau pile updating processing (FIG. 24-FIG. 26) described later is executed, and in a step S13, it is determined whether or not a touch is being made similar to the step S5. If "YES" in the step S13, that is, if a touch is being made, the process proceeds to a step S17 as it is.

On the other hand, if "NO" in the step S13, that is, if a touch is not being made, "0" is set to the variable Tk indicating the number of the row of the tableau pile that the player touches in a step S15, and the process proceeds to the step S17.

In the step S17, the game screen updating processing is executed. Although detailed explanation is omitted, the CPU core 34 draws all the card objects OBJ in the game field according to the card data 74*c*. Accordingly, the game screen (100, 200) is updated.

Furthermore, as described above, if there is no hand, "NO" is determined in the step S3, and it is determined whether or not a touch-on operation is made in the step S19 shown in FIG. 19. That is, the CPU core 34 determines whether or not a touch-off state shifts to a touch-on state. More specifically, the CPU core 34 determines whether or not the touch flag 74*i* is turned off, the coordinate data is stored as currently-touched-coordinate data 74*d*, and the NULL data is stored as previously-touched-coordinate data 74*e*.

If "YES" in the step S19, that is, if the touch flag 74*i* is turned off, the coordinate data is stored as currently-touched-coordinate data 74*d*, and the NULL data is stored as previously-touched-coordinate data 74*e*, it is determined that a touch-on operation is made, and touch-on operation processing (see FIG. 22) described later is executed in a step S21, and then the process proceeds to the step S11 shown in FIG. 18.

Although illustration is omitted, when "YES" is determined in the step S19, the touch flag 74*i* is turned on.

On the other hand, if "NO" in the step S19, that is, if the touch flag 74*i* is turned on, if the touch flag 74*i* is turned off, but the coordinate data except for the NULL data is stored as previously-touched-coordinate data 74*e*, or if the touch flag 74*i* is turned off, but the NULL data is stored as currently-touched-coordinate data 74*d*, it is determined that a touch-on operation is not made, and it is determined whether or not a touch is being made in a step S23 similar to the step S5.

If "NO" in the step S23, that is, if a touch is not being made, the process proceeds to the step S11 as it is. On the other hand, if "YES" in the step S23, that is, if a touch is being made, card acquiring processing (see FIG. 23) described later is executed in a step S25, and the process proceeds to the step S11.

It should be noted that a scan time from the step S3 to the step S17 is one frame. Accordingly, the game screen (100, 200) is updated for each frame.

Figure 20:
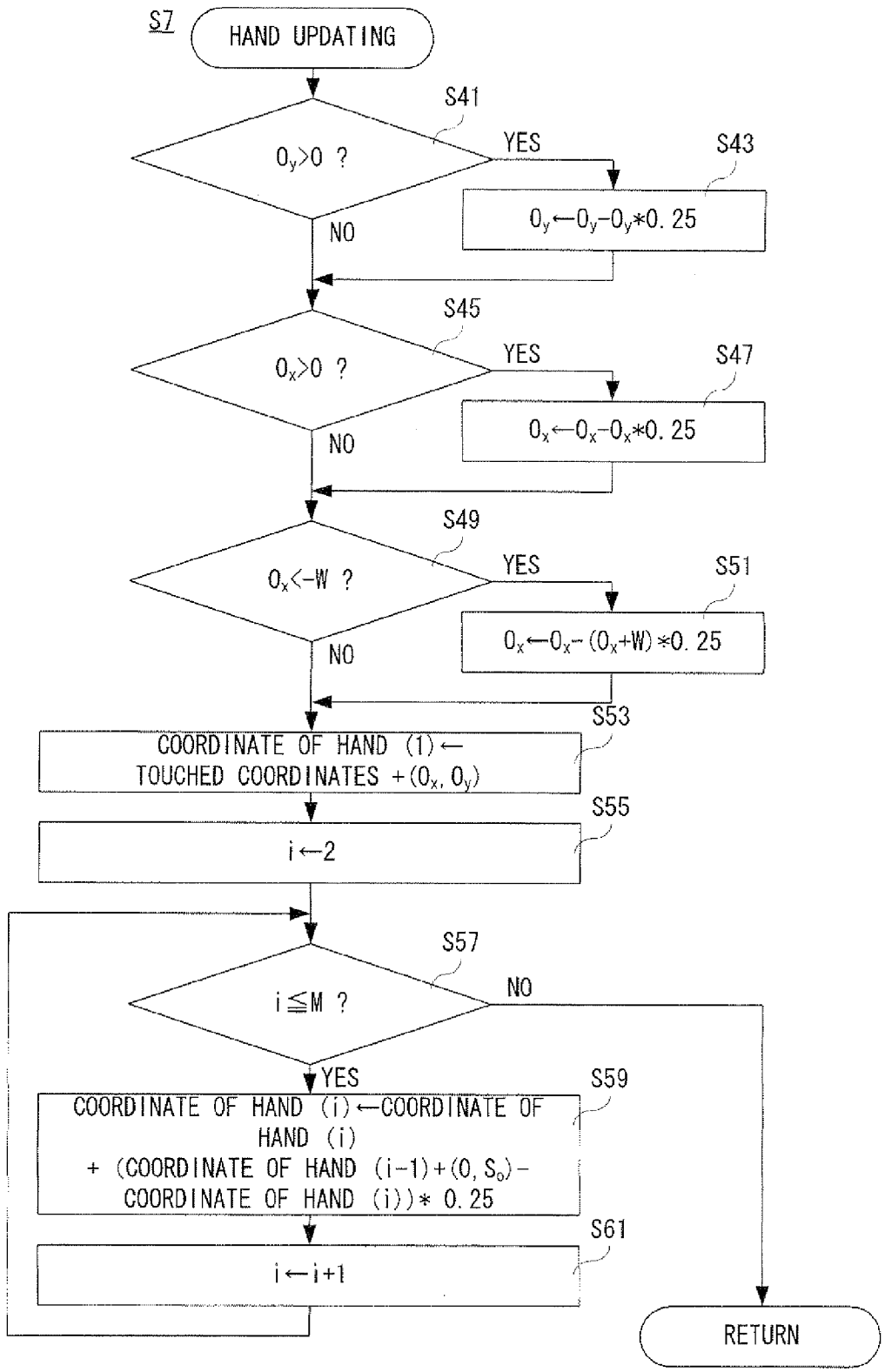
FIG. 20 is a flowchart showing hand updating processing by the CPU core shown in FIG. 2.

FIG. 20 is a flowchart showing the hand updating processing in the step S7 shown in FIG. 18. As shown in FIG. 20, when starting the hand updating processing, the CPU core 34 determines whether or not the distance Oy in the Y-axis direction indicated by the distance data 74*f* is larger than 0. Here, the CPU core 34 determines whether or not the touched coordinate is above the card object OBJ as a hand.

If "NO" in the step S41, that is, if the distance Oy in the Y-axis direction is equal to or less than 0, the process proceeds to a step S45. On the other hand, if "YES" in the step S41, that is, if the distance Oy in the Y-axis direction is larger than 0, it is determined that the touched coordinate is above the card object OBJ as a hand, and Oy−Oy*0.25 is set to the distance Oy in a step S43, and the process proceeds to the step S45. That is, the CPU core 34 shortens the distance Oy by 25% to make the card object OBJ as a hand close to the touched coordinate in the step S43.

In the step S45, it is determined whether or not the distance Ox is more than 0. That is, the CPU core 34 determines whether or not the touched coordinate is positioned at the left of the card object OBJ as a hand. If "NO" in the step S45, that is, if the distance Ox is equal to or less than 0, the process proceeds to a step S49. If "YES" in the step S45, that is, if the distance Ox is larger than 0, it is determined that the touched coordinate is positioned at the left of the card object OBJ as a hand, Ox−Ox*0.25 is set to the distance Ox in a step S47, and the process proceeds to the step S49. As described above, in the step S47, the CPU core 34 shortens the distance Ox by 25% to make the card object OBJ as a hand close to the touched coordinate.

In the step S49, it is determined whether or not the distance Ox is less than −W. It should be noted that the constant W is a horizontal width (the number of dots) of the card object OBJ as described above. That is, the CPU core 34 determines the touched coordinate is positioned at the right of the card object OBJ as a hand. If "NO" in the step S49, that is, if the distance Ox is equal to or more than −W, the process proceeds to a step S53 as it is. On the other hand, if "YES" in the step S49, that is, if the distance Ox is less than −W, Ox−(Ox+W)*0.25 is set to the distance Ox in a step S51, and the process proceeds to a step S53. That is, CPU core 34 also shortens the distance Ox by 25% to make the card object OBJ as a hand close to the touched coordinate in the step S51.

In the step S53, a value obtained by adding the distance (Ox, Oy) to the touched coordinate is set to the coordinate of the hand (1). Here, the hand (1) is the card object OBJ arranged at the bottommost position out of all the card objects OBJ as hands. Here, a number (1, 2, . . . , M) is applied to each card object OBJ as a hand from the bottommost card object OBJ.

Accordingly, if the touched coordinate and the hand (1) are far away from each other by the processing in the steps S41-step S51, the hand (1) is moved so as to be gradually close to the touched coordinate.

In a next step S55, "2" is set to the variable i. Here, the variable i is utilized for individually identifying the card objects OBJ as hands. In a succeeding step S57, it is determined whether or not the variable i is equal to or less than a maximum value M. Here, the maximum value M is a total number of the card objects OBJ as hands. That is, the CPU core 34 determines whether or not the update processing is ended as to all the card objects OBJ as hands in the step S57.

If "NO" in the step S57, that is, if the variable i is larger than the maximum value M, it is determined that the update processing is ended as to all the card objects OBJ as hands, and the process is returned to the main processing. On the other hand, if "YES" in the step S57, that is, if the variable i is equal to or less than the maximum value M, it is determined that there is the card object OBJ as a hand on which the update processing has not been executed, and in a step S59, the coordinate of the hand (i)+(the coordinate of the hand (i−1)+ (0, So)−the coordinate of the hand (i))*0.25 is set to the coordinate of the hand (i). Here, the So is the maximum space in the Y-axis direction as described above.

Then, in a step S61, 1 is added to the variable i, and the process returns to the step S57. That is, the update processing as to the next card object OBJ as a hand is executed. However, if there is no card object OBJ as a hand as described above, the process returns to the main processing.

Thus, if the outside of the card object OBJ is touched to acquire the card object OBJ by the processing in the steps S41-S51, it is implemented that the card object OBJ moves to the touched coordinate. Thus, even if the card object OBJ which is off the screen is acquired, the acquired card object OBJ is moved into the screen, so that it is possible to easily identify and operate the acquired card object OBJ.

Furthermore, by the processing in the steps S57-S61, the card object OBJ as a hand (i (equal to or more than 2, here)) follows the card object OBJ directly below so as to shorten the distance with the card object OBJ directly below by a predetermined ratio (25%).

Figure 21:
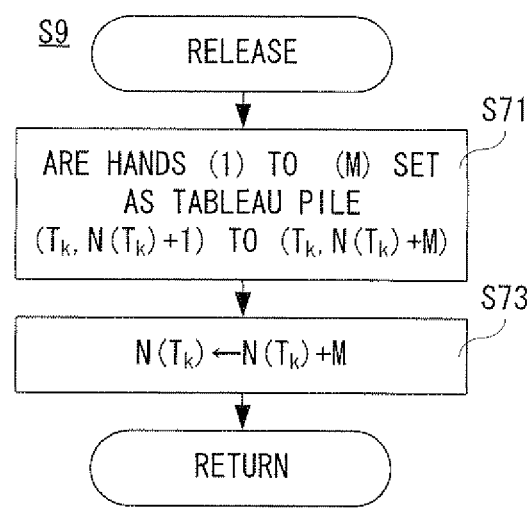
FIG. 21 is a flowchart showing release processing by the CPU core shown in FIG. 2.

FIG. 21 shows a flowchart showing the release processing in the step S9 shown in FIG. 18. As shown in FIG. 21, when starting the release processing, the CPU core 34 sets the hand (1) to the hand (M) as the tableau pile (Tk, N(Tk)+1) to the tableau pile (Tk, N(Tk)+M) touched when the hand (1) is selected as a hand in a step S71. That is, in the release processing, the hand (M) from hand (1) is returned to the original position. Here, the N (Tk) is a total number of the card objects OBJ existing in the touched row (k) out of all the card objects OBJ of the tableau pile. Then, in a step S73, N (Tk)+M is set to the variable N (Tk), and the process returns to the main processing. That is, the CPU core 34 makes an addition by the number of card objects OBJ as a hand which is returned to the original position to thereby update the total number of the card objects OBJ in the touched row (k) in the step S73.

Figure 22:
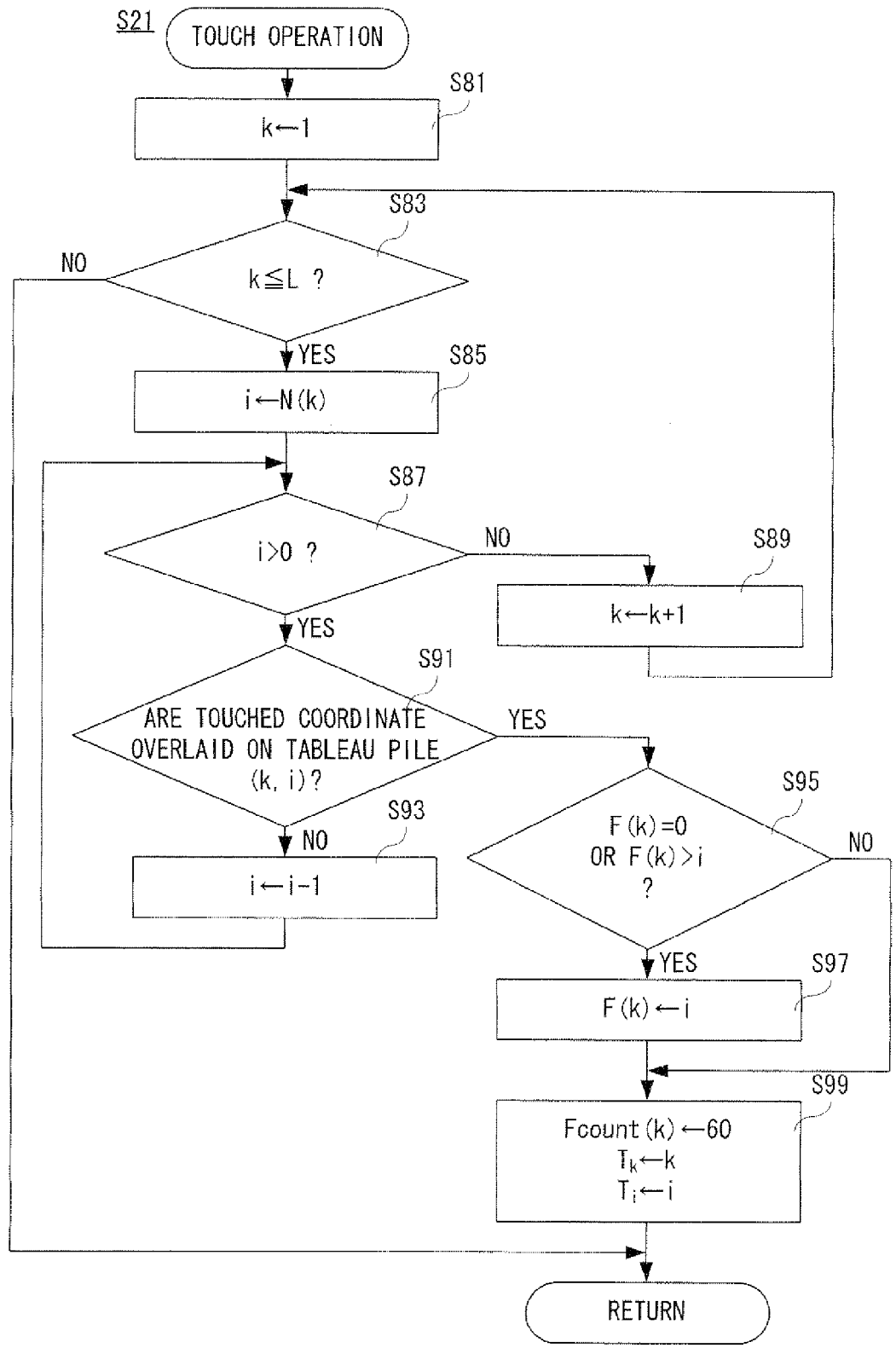
FIG. 22 is a flowchart showing touch-on operation processing by the CPU core shown in FIG. 2.

FIG. 22 is a flowchart showing touch-on operation processing in the step S21 shown in FIG. 19. As shown in FIG. 22, when starting the touch-on operation processing, the CPU core 34 sets "1" to the variable k in a step S81. Here, the variable k is utilized for identifying the row of the tableau pile. The number of the row is as described above.

In a next step S83, it is determined whether or not the variable k is equal to or less than a maximum value L. That is, the CPU core 34 determines whether or not a touch-on operation is performed as to each of all the rows. Here, the maximum value L is different depending on the kind of the game and the difficulty level. If "NO" in the step S83, that is, if the variable k is larger than the maximum value L, it is determined that the touch-on operation processing is executed on each of all the rows, and the process directly returns to the main processing. On the other hand, if "YES" in the step S83, that is, if the variable k is equal to or less than the maximum value L, it is determined that there is a row on which the touch-on operation processing has not been executed, and in a step S85, N (k) is set to the variable i. Here, the variable i is utilized for identifying the card objects OBJ in the row (k), and N (k) is a total number of the card objects OBJ in the row (k).

Succeedingly, in a step S87, it is determined whether or not the variable i is larger than 0. If "NO" in the step S87, that is, if the variable i is 0, it is determined that there is no card object OBJ in the row (k), or it is determined that the presence or absence of a touch-on operation is judged on each of all the card objects OBJ in the row (k), in a step S89, k+1 is set to the variable k, and the process returns to the step S83. That is, the CPU core 34 shifts to touch-on operation processing with respect to the next row (k).

On the other hand, if "YES" in the step S87, that is, if the variable i is larger than 0, it is determined whether or not the touched coordinate is overlaid on the card object OBJ of the tableau pile (k, i) in a step S91. Here, it is determined whether or not the touched coordinate is included in the display region of the card object OBJ. Here, the tableau pile (k, i) means the i-th card object OBJ in the row (k).

Furthermore, although detailed explanation is omitted, since the display position (arrangement position) and size of the card object OBJ are understood from the card data 74c, it is possible to easily check whether or not the touched coordinate is overlaid on the card object OBJ (tableau pile (k, i)).

In addition, the card objects OBJ as a tableau pile are arranged so as to be overlapped with each other in each row, and therefore, the display region of the card object OBJ and the display region of the card objects OBJ overlaid below it are overlapped with each other, but in view of the rule of the virtual game, the upper card objects OBJ are handled with a priority, so that the card object OBJ is checked from the top in turn.

If "NO" in the step S91, that is, if the touched coordinate is not overlaid on the tableau pile (k, i), i−1 is set to the variable i in a step S93, and the process returns to the step S87. That is, the CPU core 34 determines whether or not the touched coordinate and the (next) card object OBJ directly below it are overlaid.

On the other hand, if "YES" in the step S91, that is, if the touched coordinate is overlaid on the tableau pile (k, i), it is determined whether or not the number F(k) of the focused (touched) card object OBJ in the row (k) is 0, or it is determined whether or not the number F(k) is larger than the variable i in a step S95. That is, it is determined whether or not there is no card object OBJ which is currently being focused in the row (k), or whether or not focusing a card object OBJ below the card object OBJ which is currently being focused (lower priority) is instructed.

If "YES" in the step S95, that is, if the number F(k) is 0, or if the number F(k) is larger than the variable i, a numerical value of the variable i is set to the number F(k) in a step S97, and the process proceeds to a step S99. That is, if there is no card object OBJ which is currently being focused in the row (k), the card object OBJ to be focused by the current touch-on operation is set. Furthermore, if there is a card object OBJ which is currently being (or has already been) focused in the row (k), when a card object OBJ below it is touched, the focused card object OBJ is updated.

On the other hand, if "NO" in the step S95, that is, if the number F (k) is not 0, and the number F (k) is equal to or less than the variable i, the process proceeds to the step S99 as it is. In the step S99, "60" is set to the count value Fcount (k) of the focus counter 74j, the row (k) is set to the variable Tk for storing the row (k) on which the touch-on operation is performed, and the numerical value of the variable i is set to the variable Ti for storing the card on which the touch-on operation is performed, and then, the process returns to the main processing.

Figure 23:
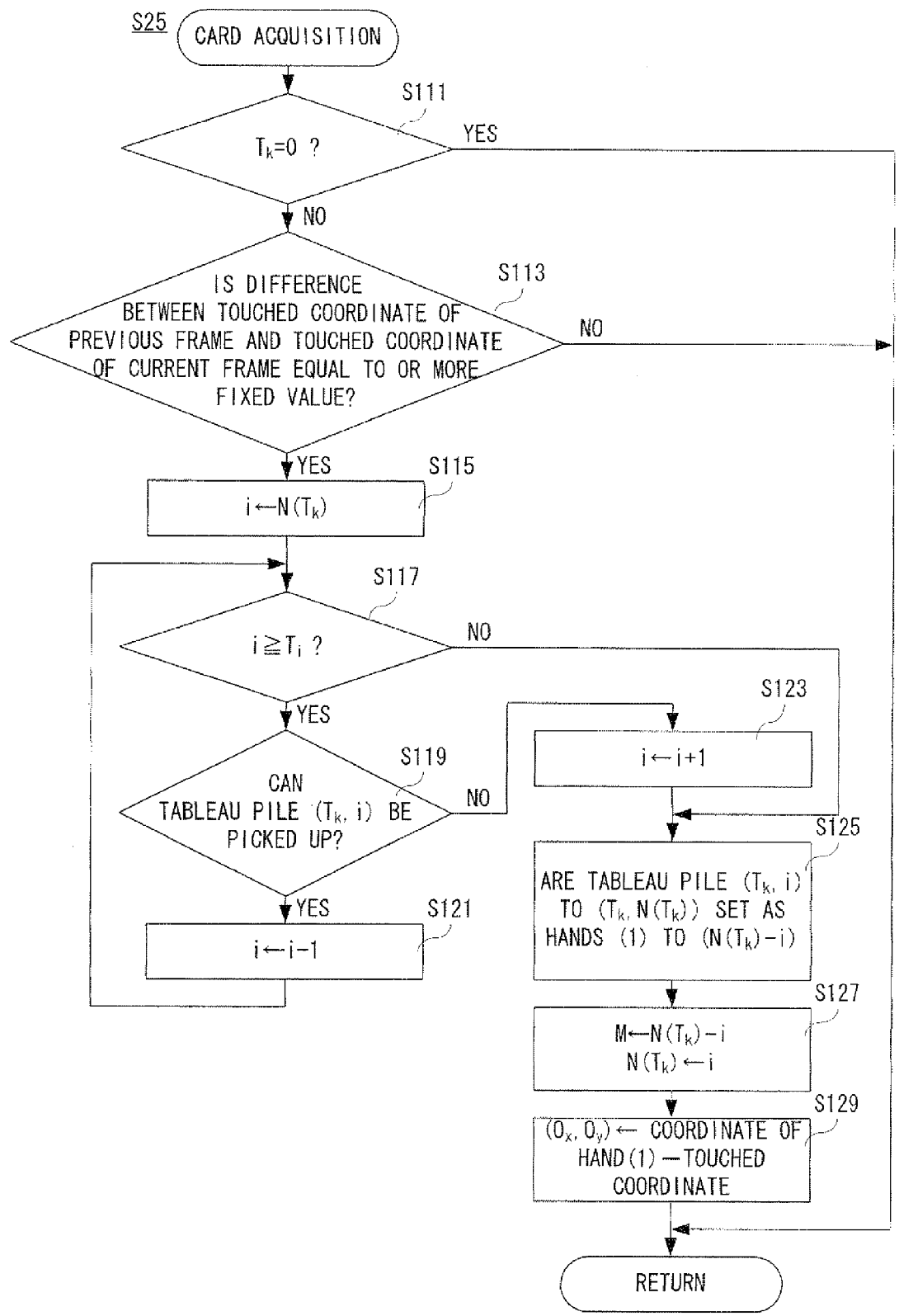
FIG. 23 is a flowchart showing card acquiring processing by the CPU core shown in FIG. 2.

FIG. 23 is a flowchart showing card acquiring processing in the step S25 shown in FIG. 19. As shown in FIG. 23, when starting the card acquiring processing, it is determined whether or not the variable Tk is 0 in a step S111. That is, it is determined whether or not no card object OBJ in any row (k) (the card object OBJ of the tableau pile) is touched. If "YES" in the step S111, that is, if the variable Tk is 0, it is determined that no card object OBJ in any row (k) is touched, and the process returns to the main processing.

However, if "NO" in the step S111, that is, if the variable TK is not 0, by regarding that any card object OBJ in the row (k) is touched, it is determined whether or not a difference between the touched coordinate at the previous frame and the touched coordinate at the current frame is equal to or more than a fixed value in a step S113. More specifically, a difference (absolute value) between the touched coordinate indicated by the previously-touched-coordinate data 74e (previously-touched coordinate) and the touched coordinate indicated by the currently-touched-coordinate data 74d (currently-touched coordinate) is detected, and it is determined whether or not the difference is larger than a fixed value (fixed threshold value). The fixed value (fixed threshold value) here is for determining whether or not a dragging operation is started, and set by a value empirically obtained by examinations, etc.

If "NO" in the step S113, if the difference between the previously-touched coordinate and the currently-touched coordinate is less than the fixed value, it is determined that a dragging operation is not started, and the process returns to the main processing as it is. On the other hand, if "YES" in the step S113, the difference between the previously-touched coordinate and the currently-touched coordinate is equal to or more than the fixed value, it is determined that a dragging operation is started, and a total number of card objects OBJ in the touched row (k) is set to the variable i in a step S115.

Successively, in a step S117, it is determined whether or not the variable i is equal to or more than the number Ti of the touched tableau pile (Tk, i). If "NO" in the step S117, that is, if the variable i is less than the number Ti of the touched tableau pile (Tk, i), the process directly proceeds to a step S125. On the other hand, if "YES" in the step S117, that is, if the variable i is equal to or more than the number Ti of the touched tableau pile (Tk, i), it is determined whether or not the touched tableau pile (Tk, i) can be picked up in a step S119. That is, the CPU core 34 determines whether or not the touched tableau pile (Tk, i) is upturned, and the predetermined rule of the virtual game of this embodiment is not violated. Here, the predetermined rule is different between Klondike and Spider as described above.

If "YES" in the step S119, that is, if the touched tableau pile (Tk, i) can be picked up, i−1 is set to the variable i in a step S121, and the process returns to the step S117. That is, it is determined whether or not the (next) card object OBJ directly below in the row (k) can be picked up. On the other hand, if "NO" in the step S119, that is, if the touched tableau pile (Tk, i) cannot be picked up, i+1 is set to the variable i in a step S123, and the process proceeds to the step S125. By the processing in the step S123, the variable i is returned to the (prior) card object OBJ directly above the card object OBJ which can be determined to be picked up.

In the step S125, the tableau pile (Tk, i) to the tableau pile (Tk, N (Tk)) in the touched row (k) are set as hands (1) to (N(Tk)−i). That is, one or a plurality of card objects OBJ which can be picked up and are subsequently overlaid below the Y coordinate of the touched coordinate is selected as a hand. Accordingly, as described above, even the card object OBJ which is not directly touched can be automatically selected as a hand.

Here, although detailed explanation is omitted, the card data 74c is updated at this time. As described above, the information about the hand is added to the discrimination data without erasing the information about the tableau pile. Then, when the card object OBJ is moved to another row, the hand information is erased, and the tableau pile information is updated.

Succeedingly, in a step S127, N (Tk)−i is set to a total number M of the hand, and a numerical value of the variable i is set to the total number N (Tk) of the card objects OBJ in the row (k). Then, in a step S129, coordinate of the hand (1)-touched coordinate (currently-touched coordinate) is set to the distance (Ox, Oy), and the process returns to the main processing.

Figure 24:
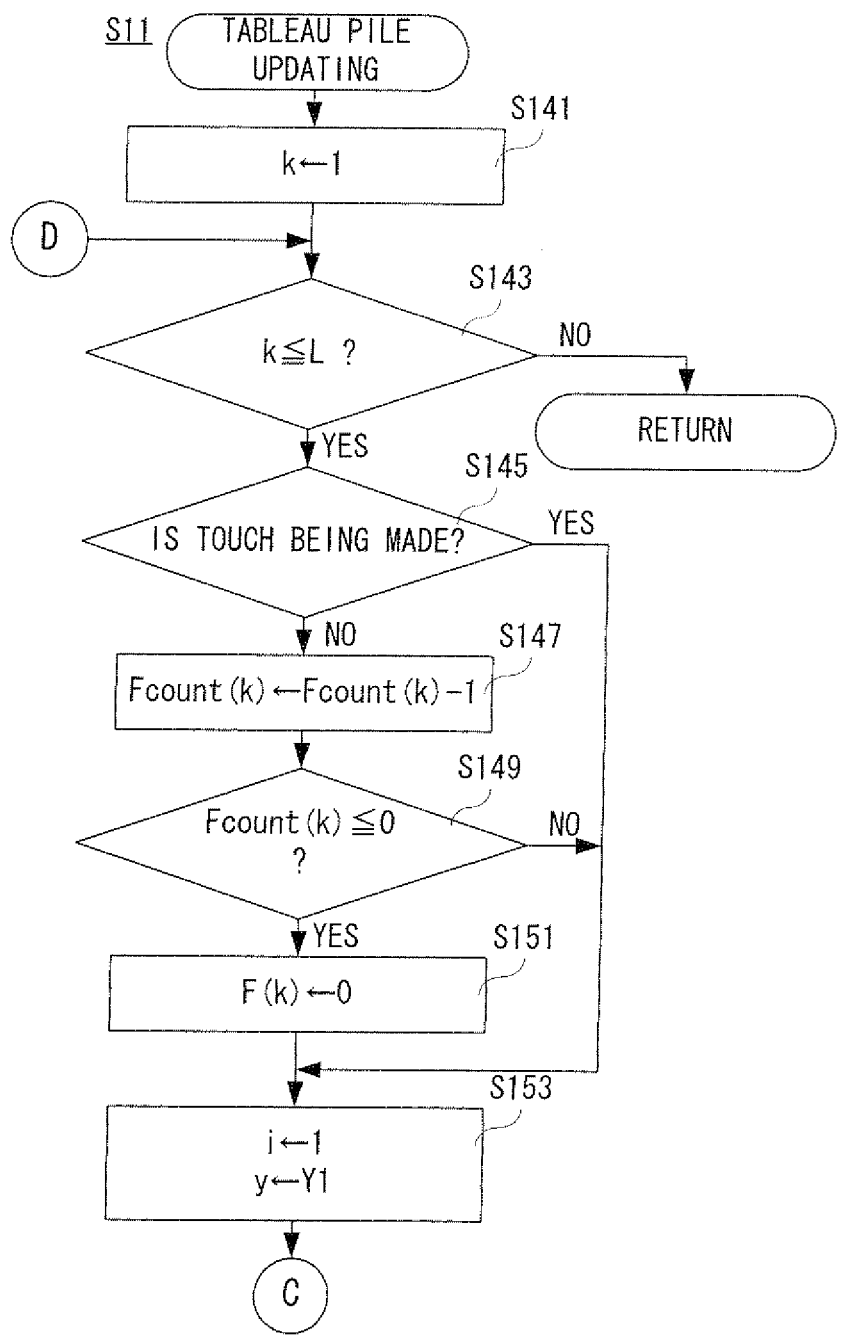
FIG. 24 is a flowchart showing a part of tableau pile updating processing by the CPU core shown in FIG. 2.
Figure 25:
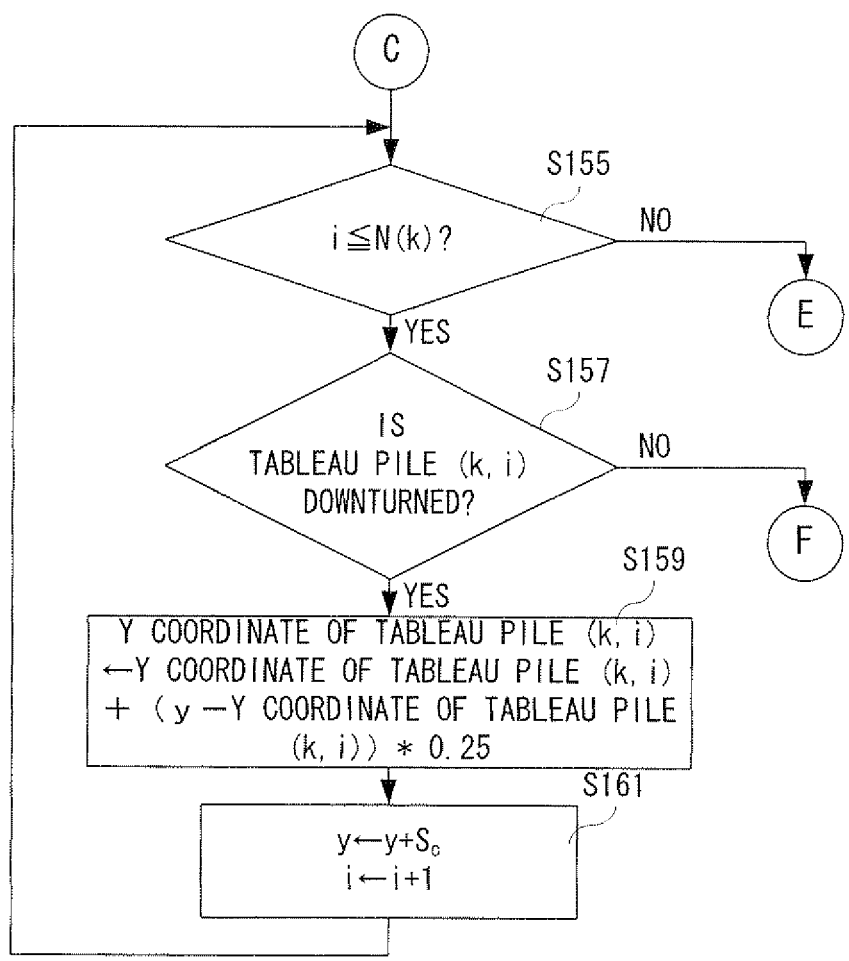
FIG. 25 is a flowchart showing another part of the tableau pile updating processing by the CPU core shown in FIG. 2, and sequel to FIG. 24.
Figure 26:
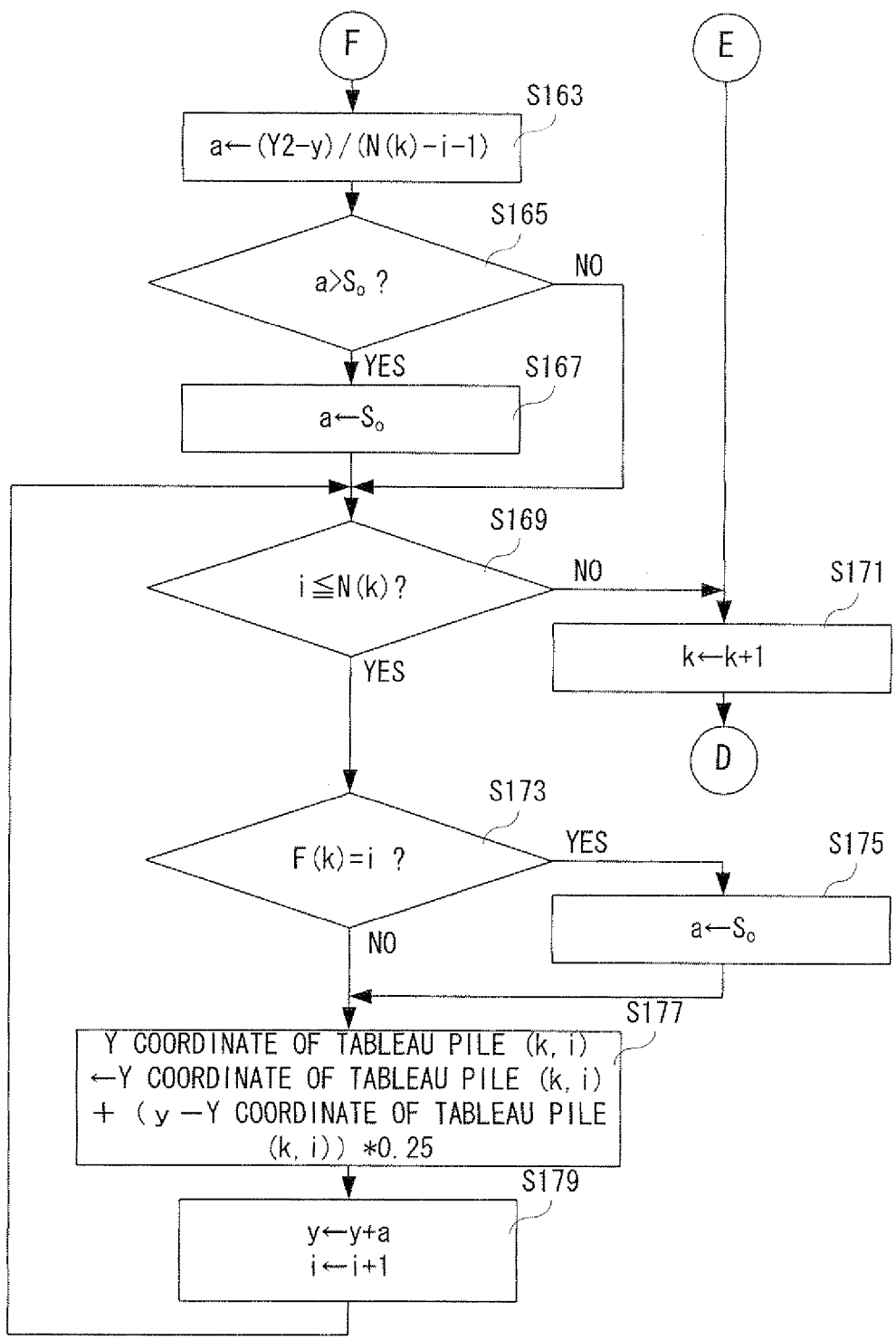
FIG. 26 is a flowchart showing a still another part of the tableau pile updating processing by the CPU core shown in FIG. 2, and sequel to FIG. 25.

FIG. 24-FIG. 26 is a flowchart showing tableau pile updating processing in the step S11 shown in FIG. 18. As shown in FIG. 24, when starting tableau pile updating processing, the CPU core 34 sets "1" to the variable k in a step S141. That is, update processing as to the row (1) of the tableau pile is first executed. In a succeeding step S143, it is determined whether or not the variable k is equal to or less than the maximum value L. The maximum value L here is a total number of the rows (k) of the tableau pile.

If "NO" in the step S143, that is, if the variable k is larger than the maximum value L, it is determined that the update processing as to all the rows (k) is ended, and the process returns to the main processing. On the other hand, if "YES" in the step S143, that is, if the variable k is equal to or less than the maximum value L, it is determined that there is the row (k) on which update processing has not been ended, and it is determined that a touch is being made in a step S145. The processing in the step S145 is the same as the above-described the step S5 in the main processing, and detailed explanation is omitted.

If "YES" in the step S145, that is, if a touch is being made, the process proceeds to a step S153 as it is. On the other hand, if "NO" in the step S145, that is, if a touch is not being made, Fcount (k)−1 is set to the count value Fcount (k) in a step S147, and it is determined whether or not the count value Fcount (k) is equal to or less than 0 in a step S149. That is, it is determined whether or not a certain period of time during which a focus is made (60 frames) elapses.

If "NO" in the step S149, that is, if the count value Fcount (k) is larger than 0, it is determined that the certain period of time during which a focus is made does not elapse, and the process proceeds to the step S153 as it is. On the other hand, if "YES" in the step S149, that is, if the count value Fcount (k) is equal to or less than 0, it is determined that the certain period of time during which a focus is made elapses, "0" is set to the variable F(k) in a step S151, and the process proceeds to the step S153. Here, the variable F(k) is utilized for indicating the focused (touched) row (k).

In the step S153, "1" is set to the variable i, and "Y1" is set to the variable y. Here, the variable i is used for identifying the card object OBJ in the row (k). Furthermore, the variable y is utilized for setting the space-a-between-Y-coordinates of the overlaid card objects OBJ. In addition, the constant Y1 is the Y coordinate in the world coordinate system of the position where the origin point P (vertex at the upper left) of the bottommost card object OBJ in the row (k) of the tableau pile is to be arranged.

As shown in FIG. 25, in a next step S155, it is determined whether or not the variable i is equal to or less than the maximum value N (k). That is, it is determined whether or not update processing is executed with respect to all the card objects OBJ in the row (k). If "NO" in the step S155, that is, if the variable i is larger than the maximum value N (k), it is determined that the update processing is executed with respect to all the card objects OBJ, and the process proceeds to a step S171 shown in FIG. 26. On the other hand, if "YES" in the step S155, that is, if the variable i is equal to or less than the maximum value N (k), it is determined that there is card object OBJ in the row (k) on which the update processing has not been performed, and in a step S157, it is determined whether or not the tableau pile (k, i) is downturned. That is, the CPU core 34 determines whether or not the situation determining flag of the tableau pile (k, i) is turned off with reference to the card data 74c.

If "NO" in the step S157, that is, if the tableau pile (k, i) is upturned, the process proceeds to a step S163 shown in FIG. 26. On the other hand, if "YES" in the step S157, that is, if the tableau pile (k, i) is downturned, the Y coordinates of the tableau pile (k, i)+(y−Y coordinate of the tableau pile (k, i))*0.25 is set to the Y coordinate of the tableau pile (k, i) in a step S159. Then, in a step S161, y+Sc is set to the variable y, i+1 is set to the variable i, and the process returns to the step S155. Here, the constant Sc is the space between the Y coordinates of the downturned card objects OBJ.

As described above, if the tableau pile (k, i) is upturned, "NO" in the step S157, and (Y2−y)/(N(k)−i−1) is set to a variable a in the step S163 shown in FIG. 26. Here, the variable a is the space between the Y coordinates of the upturned card objects OBJ as described above, and the constant Y2 is the Y coordinate of the bottom end of the display region (102, 202) of the tableau pile. That is, the CPU core 34 divides the length (Y2−y) obtained by subtracting the length in the Y-axis direction to display the downturned card object OBJ from the length in the Y-axis direction of the display region (102, 202) of the tableau pile so as to make each of the space between the Y-coordinates of the upturned card objects equal in the step S163.

In a next step S165, it is determined whether or not the variable a is larger than the maximum space So. If "NO" in the step S165, that is, if the variable a is equal to or less than the maximum space So, the process proceeds to a step S169 as it is. On the other hand, if "YES" in the step S165, that is, if the variable a is larger than the maximum space So, the maximum space So is set to the variable a in a step S167, and the process proceeds to the step S169. That is, the space-a-between-the-Y-coordinates is corrected (restricted) so as not to be above the maximum space So.

In the step S169, similar to the step S155, it is determined whether or not the variable i is equal to or less than the maximum value N(k). If "NO" in the step S169, that is, if the variable i is larger than the maximum value N(k), k+1 is set to the variable k in the step S171, and the process returns to the step S143 shown in FIG. 24. That is, update processing as to the next row (k) is executed.

However, if "YES" in the step S169, that is, if the variable i is equal to or less than the maximum value N(k), it is determined whether or not the variable F(k) and the variable i are equal in a step S173. That is, it is determined whether or not the card object OBJ which is being noted is a focused card object OBJ. If "NO" in the step S173, that is, if the variable F (k) and the variable i are not equal to each other, the process proceeds to a step S177 as it is. On the other hand, if "YES" in the step S173, that is, if the variable F(k) and the variable i are equal to each other, the space-a-between-Y-coordinates is set to the maximum space So, and the process proceeds to the step S177.

In the step S177, the Y coordinate of the tableau pile (k, i)+(y−the Y coordinate of the tableau pile (k, i))*0.25 is set to the Y coordinate of the tableau pile (k, i) similar to the step S159. Then, in a step S179, y+a is set to the variable y, and i+1 is set to the variable i, and the process returns to the step S169.

According to this embodiment, when the player performs a touch-on operation on a card object, the card object is moved so as to make the content of the card object overlaid below it appear, and therefore, it is possible to easily see the content of the card object without being restricted to the size of the display screen. Furthermore, there is no limit on the total number of the card objects and the total number of card objects to be displayed due to the size of the display screen.

Here, in this embodiment, by moving downward (plus direction of the Y-axis in the world coordinates) the card objects above the card object which the player touches, the exposed amount of the card object below it is increased to make the mark and character appear, but there is no need of being restricted thereto. The objects below the card object which the player touches may be moved upward (minus direction of the Y-axis in the world coordinates), and the card objects above and below the card object which the player touches may be moved in opposite directions, such as upward and downward. Alternatively, the card objects above the card object which the player touches may be moved to a right direction (plus direction of the X-axis in the world coordinates) and to a left direction (minus direction of the X-axis in the world coordinates), and the card objects above and below the card object which the player touches may be moved in opposite directions, such as in the right and left directions. In addition, the card objects above and below the card object which the player touches may be any one of the left, right, top and bottom or in oblique directions, and the card objects above and below the card object which the player touches may be moved to any one of the left, right, top, bottom and oblique direction so as to be opposed or be far away from each other.

Furthermore, in this embodiment, a display control of the card objects when the tramp game is played by utilizing the game apparatus is explained, there is no need of being restricted thereto. It should be noted that in a case that a plurality of objects are displayed on the display screen, the object above or below the object that the player touches is displaced according to an instruction from the user so as to make the content of the touched object appear. That is, in this embodiment, a game program is executed as one example of the information processing program, but there is no need of being restricted thereto.

Additionally, in this embodiment, card objects are moved so as to set each of the spaces between the Y coordinates of all the card objects above the touched card object inclusive of the touched card object to the maximum space, but there is no need of being restricted thereto. For example, all the card objects above the touched card object may be collectively moved so as to make only the kind of the touched card object appear. Furthermore, each of the spaces between the Y coordinates of only the touched card object and the card objects around it (several card objects before and after it or several card objects above or below it) may be moved to be set to the maximum space. Alternatively, the card object may be moved so as to set each of the spaces between the Y coordinates of all the card objects (only the upturned card object may be possible) in the row to which the touched card object belongs to the maximum space.

In addition, in this embodiment, under the rule of the card game, the selectable card object is card objects overlapped according to the rule, but there is no need of being restricted thereto. An associated object having an attribute the same as that of the touched object may be selected. For example, the attribute of the object includes shapes and sizes of the object as well as the marks (color and design) and the numeric characters in this embodiment.

Furthermore, the object arranged at a position having a predetermined relationship with the touched object may be selected as an associated object. For example, assuming that the position of the touched object is one vertex, an object arranged at a position to take a shape of a predetermined figure, such as a square and a regular triangle may be selected, or assuming that a predetermined point is taken as a center, an object arranged at a position being symmetric about a point or symmetric about a line with the touched object may be selected.

In addition, in this embodiment, in a case that a card object is focused by a touch-on operation, when a certain period of time (60 frames) elapses after the touch-off operation, all the card objects which has been moved to set a space between the Y coordinate to the maximum space are returned to the original positions, but directly after the touch-off operation, these may be returned to the original positions.

In addition, the configuration of the game apparatus should not be restricted to that of the above-described embodiment. For example, one LCD may be provided, or the touch panel may be provided to each of the two LCDs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing an information processing program, said information processing program causes one or more processors of an information processing apparatus to perform functionality comprising:
   displaying a plurality of overlapping objects;
   detecting coordinate data based on, in part, a selection of a designated object, out of the plurality of overlapping objects, using a pointing device;
   determining whether or not a first operation is performed on a display region of a display on the basis of the detected coordinate data; and
   moving one or more objects out of the plurality of overlapping objects displayed in said display region, without moving the object designated by said detected coordinate data and without moving one or more objects laid under the designated object, while maintaining the order of the overlapping such that the one or more objects of the plurality of overlapping objects are partly exposed to increase an exposed amount of one or more objects laid under the moved one or more objects when it is determined that the first operation is performed.

2. The non-transitory storage medium storing an information processing program according to claim 1, wherein
   the one or more objects are moved except for the designated object corresponding to a position indicated by said coordinate data and the one or more objects laid under the designated object.

3. The non-transitory storage medium storing an information processing program according to claim 1, wherein
   at least said one out of the plurality of overlapping objects is moved to a direction away from the position indicated by said coordinate data.

4. The non-transitory storage medium storing an information processing program according to claim 1, wherein said information processing program causes said one or more processors to further perform functionality comprising:
   calculating an overlapping degree between said plurality of overlapping objects,
   wherein at least one of said plurality of overlapping objects is moved according to the calculated overlapping degree between said plurality of overlapping objects.

5. The non-transitory storage medium storing an information processing program according to claim 4, wherein
   a value is calculated indicating an overlapping degree between said plurality of overlapping objects, and
   at least one out of said plurality of overlapping objects is moved when the first operation is performed, and the value indicating the calculated overlapping degree is equal to or more than a predetermined value.

6. The non-transitory storage medium storing an information processing program according to claim 1, wherein said information processing program causes said one or more processors to further perform functionality comprising:
   determining whether or not a second operation different from said first operation is performed on the basis of the detected coordinate data, and
   automatically selecting at least one object out of said plurality of overlapping objects on the basis of the detected coordinate data and automatically selecting said plurality of objects in an overlapped manner when the second operation is performed.

7. The non-transitory storage medium storing an information processing program according to claim 6, wherein said information processing program causes said one or more processors to further perform functionality comprising:
   deciding a selectable object from said plurality of overlapping objects,
   wherein at least one object out of said selectable objects is automatically selected when the second operation is performed.

8. The non-transitory storage medium storing an information processing program according to claim 6, wherein
   an object arranged at a position closest to the position indicated by the detected coordinate data is selected out of said selectable objects.

9. The non-transitory storage medium storing an information processing program according to claim 6, wherein
   at least one object out of the selectable objects is automatically selected when the second operation is performed, and even when the object corresponding to the position indicated by said coordinate data is not selectable.

10. The non-transitory storage medium storing an information processing program according to claim 6, wherein
    an object in association with the object arranged in the position closest to the position indicated by the detected coordinate data is further selected.

11. The non-transitory storage medium storing an information processing program according to claim 6, wherein said information processing program causes said one or more processors to further perform functionality comprising displaying at least one selected object on said display.

12. The non-transitory storage medium storing an information processing program according to claim 11, wherein
at least said one selected object is displayed at a position within said display region in correspondence with the position indicated by the detected coordinate data.

13. The non-transitory storage medium storing an information processing program according to claim 6, wherein said information processing program causes said one or more processors to further perform functionality comprising moving at least said one selected object so as to follow the position indicated by the detected coordinate data.

14. The non-transitory storage medium storing an information processing program according to claim 1, wherein
at least one of said plurality of overlapping objects is moved such that an exposed amount of each of said plurality of objects which is in an overlapped manner is a constant amount.

15. The non-transitory storage medium storing an information processing program according to claim 1, wherein
said pointing device includes a touch panel, and
coordinate data is detected corresponding to coordinates on said display region with respect to the position where a touch-on operation is performed on said touch panel.

16. The non-transitory storage medium storing an information processing program according to claim 14, wherein
said first operation is determined when a touch-on operation to said touch panel is detected on the basis of the detected coordinate data.

17. The non-transitory storage medium storing an information processing program according to claim 14, wherein
said second operation is determined when a dragging operation to said touch panel is detected on the basis of the detected coordinate data.

18. The non-transitory storage medium storing an information processing program according to claim 1, wherein said information processing program causes said one or more processors to further perform functionality comprising returning at least said one object to a position before movement when it is determined that said first operation ceases to be performed after at least said one object is moved.

19. The non-transitory storage medium storing an information processing program according to claim 17, wherein
at least said one object is returned to the position before movement after a certain time period elapses from when it is determined that said first operation ceases to be performed after at least said one object is moved.

20. An information processing apparatus comprising at least processing circuitry, the information processing apparatus configured to:
display a plurality of overlapping objects;
detect coordinate data based on, in part, a selection of a designated object, out of the plurality of overlapping objects, using a pointing device;
determine whether or not a predetermined operation is performed on a display region of a display on the basis of the detected coordinate data; and
move one or more objects out of the plurality of overlapping objects displayed in said display region, without moving the object designated by said detected coordinate data and without moving one or more objects laid under the designated object, while maintaining the order of the overlapping such that the one or more objects of the plurality of overlapping objects are partly exposed to increase an exposed amount of one or more objects laid under the moved one or more objects when it is determined that the predetermined operation is performed.

21. An information processing method implemented using an information processing apparatus having at least one processor, the method comprising:
displaying a plurality of overlapping objects;
detecting coordinate data based on, in part, a selection of a designated object, out of the plurality of overlapping objects, using a pointing device,
determining, via the at least one processor, whether or not a predetermined operation is performed on a display region of a display on the basis of the detected coordinate data, and
moving one or more objects out of the plurality of overlapping objects displayed in said display region, without moving the object designated by said detected coordinate data and without moving one or more objects laid under the designated object, while maintaining the order of the overlapping such that the one or more objects of the plurality of overlapping objects are partly exposed to increase an exposed amount of one or more objects laid under the moved one or more objects when it is determined that the predetermined operation is performed.

22. An information processing system, comprising:
a processing system having at least processing circuitry, the processing system configured to:
display a plurality of overlapping objects,
detect coordinate data based on, in part, a selection of a designated object, out of the plurality of overlapping objects, using the pointing device,
determine whether or not a predetermined operation is performed on a display region of the display device on the basis of the detected coordinate data, and
move one or more objects out of the plurality of overlapping objects displayed in said display region, without moving the object designated by said detected coordinate data and without moving one or more objects laid under the designated object, while maintaining the order of the overlapping such that the one or more objects of the plurality of overlapping objects are partly exposed to increase an exposed amount of one or more objects laid under the moved one or more objects when said operation determining unit determines that the predetermined operation is performed.

* * * * *